US008334902B2

(12) United States Patent
Golovchinsky et al.

(10) Patent No.: US 8,334,902 B2
(45) Date of Patent: Dec. 18, 2012

(54) SYSTEM AND METHOD FOR FACILITATING THE USE OF WHITEBOARDS

(75) Inventors: Gene Golovchinsky, Menlo Park, CA (US); Scott Carter, Palo Alto, CA (US); Jacob Biehl, Santa Clara, CA (US); Laurent Denoue, Palo Alto, CA (US)

(73) Assignee: Fuji Xerox Co., Ltd., Tokyo (JP)

(*) Notice: Subject to any disclaimer, the term of this patent is extended or adjusted under 35 U.S.C. 154(b) by 858 days.

(21) Appl. No.: 12/416,054

(22) Filed: Mar. 31, 2009

(65) Prior Publication Data

US 2010/0245563 A1    Sep. 30, 2010

(51) Int. Cl.
H04N 7/18    (2006.01)

(52) U.S. Cl. ......... 348/135; 348/157; 348/836; 382/115

(58) Field of Classification Search .......... 348/207, 348/14, 211, 135; 345/156; 353/30; 702/16
See application file for complete search history.

(56) References Cited

U.S. PATENT DOCUMENTS

| 7,031,842 | B1 * | 4/2006 | Musat et al. ............ 702/16 |
| 2004/0201698 | A1 * | 10/2004 | Keenan et al. ............ 348/207.99 |
| 2009/0086042 | A1 * | 4/2009 | Vartiainen et al. ......... 348/211.4 |
| 2009/0096994 | A1 * | 4/2009 | Smits ......................... 353/30 |
| 2010/0079369 | A1 * | 4/2010 | Hartmann et al. .......... 345/156 |
| 2010/0188478 | A1 * | 7/2010 | Robinson et al. .......... 348/14.16 |

OTHER PUBLICATIONS

G.D. Abowd, et al., "The Location Service: A Framework for Handling Multiple Location Sensing Technologies", http://www.cc.gatech.edu/fce/ahri/publications/location_service.pdf.

V. Bellotti, et al., "From Web Press to Web Pressure: Multimedia Representations and Multimedia Publishing", In Proceedings of the ACM Conference on Human Factors in Computing Systems, (Atlanta, Georgia, United States, 1997), ACM, 279-286.

M. Cherubini, et al., "Let's Go to the Whiteboard: How and Why Software Developers use Drawings", In Proceedings of the ACM Conference on Human Factors in Computing Systems, (San Jose, CA, USA, 2007), ACM, 557-566.

Clearboard, http://www.softtouchit.com/products/clearboard/.

J. Foote, et al., "Remote Interactive Graffiti", In Proceedings of ACM Conference on Multimedia, (New York, NY, USA, 2004), ACM, 762-763.

M.D. Gross, et al., "Ambiguous Intentions: A Paper-Like Interface for Creative Design", In Proceedings ACM Symposium on User Interface Software and Technology, (Seattle, Washington, United States, 1996), ACM, 183-192.

(Continued)

*Primary Examiner* — Thuong Nguyen
(74) *Attorney, Agent, or Firm* — Sughrue Mion, PLLC

(57) ABSTRACT

Systems and methods for facilitating use of non-electronic whiteboards and other large displays. Images of whiteboard are input to a computer device to provide automatic detection of a collaborative portion of content on the board created during a collaborative session and distribution to relevant collaborators alone while personal content of board is not distributed. Modification history of writings are preserved and displayed as change histograms to assist a user locate content that may have been erased. User finds the content by inspecting regions of board that correspond to user's memory of approximate location and time of modifying the content and are shown on the histogram as having been modified. Persistent reminder notes that clutter board space are detected and stored based on their location on the board and duration of persisting on the board so that they may be erased.

19 Claims, 26 Drawing Sheets

OTHER PUBLICATIONS

W. Ju, et al., "Exploring Implicit Interaction through Electronic Whiteboard Design", To Appear in Proceedings of the ACM Conference on Computer Supported Cooperative Work, (San Diego, California, United States, 2008), ACM.

T.P. Moran, et al., "Design and technology for Collaborage: collaborative collages of information on physical walls", In Proceedings of the 12$^{th}$ annual ACM symposium on User interface software and technology, (Asheville, North Carolina, United States, 1999), ACM, 197-206.

N.B. Priyantha, et al., "The Cricket location-support system", In Proceedings of the International Conference on Mobile Computing and Networking, 2000, ACM, 32-43.

E. Saund, "Bringing the Marks on a Whiteboard to Electronic Life", In Proceedings of the Second International Workshop on Cooperative Buildings, Integrating Information, Organization, and Architecture, (1999), Springer-Verlag, 69-78.

J.C. Tang, "Findings from Observational Studies of Collaborative Work", International Journal of Man-Machine Studies, 34. 143-160.

R. Want, et al., "The Active Badge Location System" ACM Transactions on Information Systems, 10 (1). 91-102. 1992.

S. Whittaker, et al., "Back to the Future: Pen and Paper Technology Supports Complex Group Coordination", In Proceedings of the ACM Conference on Human factors in Computing Systems, (Denver, Colorado, United States, 1995), ACM Press/Addison-Wesley Publishing Co., 495-502.

Y. Xiao, et al., "What Whiteboards in a Trauma Center Operating Suite Can Teach Us About Emergency Department Communication", Annals of Emergency Medicine, 50 (4). 387-395.

L.E. Holmquist, et al., "Total Recall: in-place viewing of captured whiteboard annotations", CHI '03. pp. 980-981.

T. Matthews, et al., "Clipping Lists and Change Borders: Improving Multitasking Efficiency with Peripheral Information Design" CHI '06. pp. 989-998.

D. Tan, et al., "WinCuts: manipulating arbitrary window regions for more effective use of screen space". CHI '04. pp. 1525-1528.

M.G. Pimentel, et al., "Supporting Educational Activities through Dynamic Web Interfaces Interacting with Computers" vol. 13, Issue 3, pp. 353-374, Feb. 2001.

E. Saund, et al., "Bringing the Marks on a Whiteboard to Electronic Life", In Proceedings of the Second International Workshop on Cooperative Buildings, Integrating Information, Organization, and Architecture, (1999), Springer-Verlag, 69-78.

Nancy A. Van House, "Interview Viz: Visualization-Assisted Photo Elicitation", CHI 2006. pp. 1463-1468.

Bodytag BT-002, http://www.blueon.com/index.php?id=263.

HEATMAPAPI.COM, http://www.heatmapapi.com/.

* cited by examiner

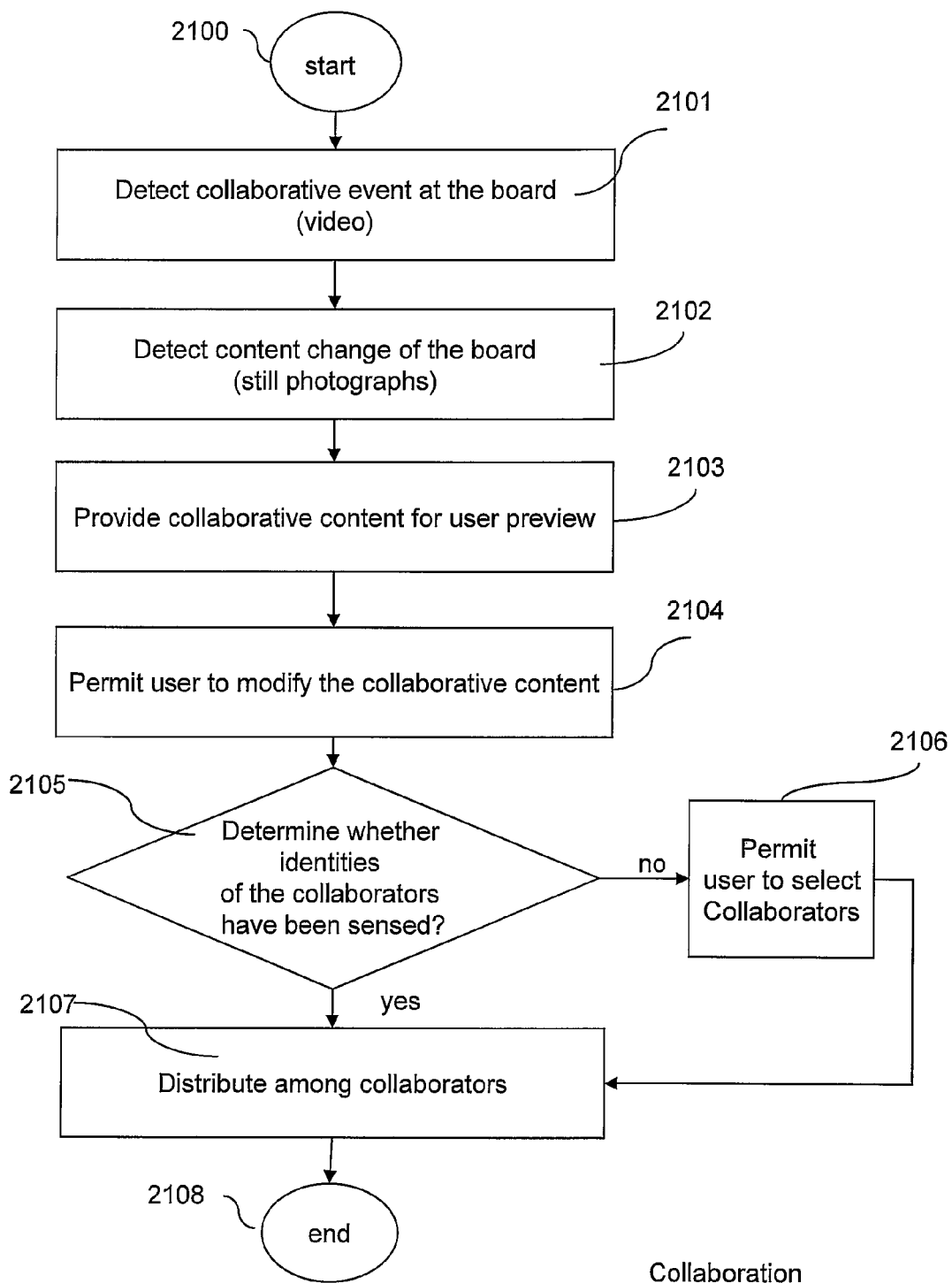

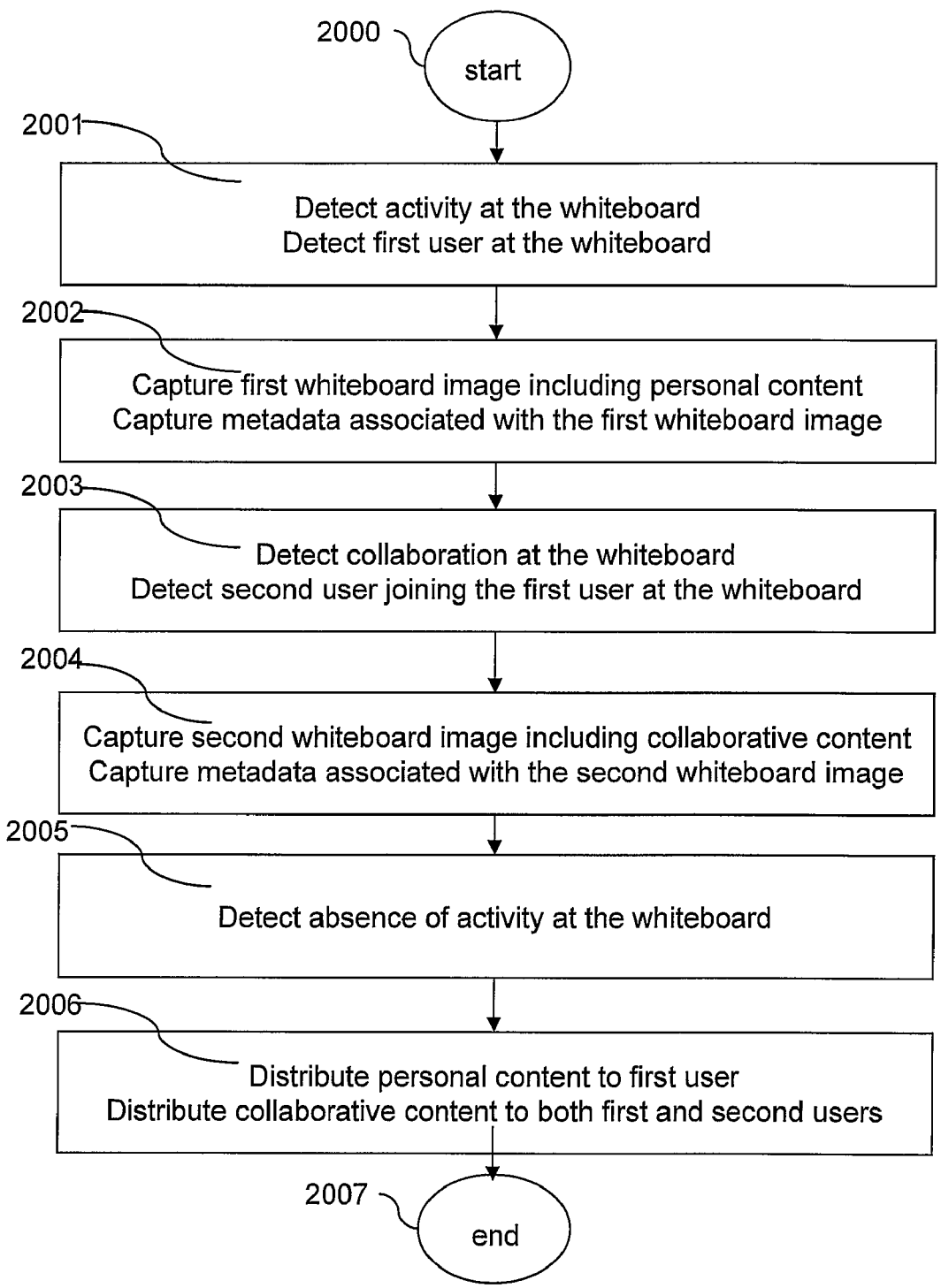

Saving captured content

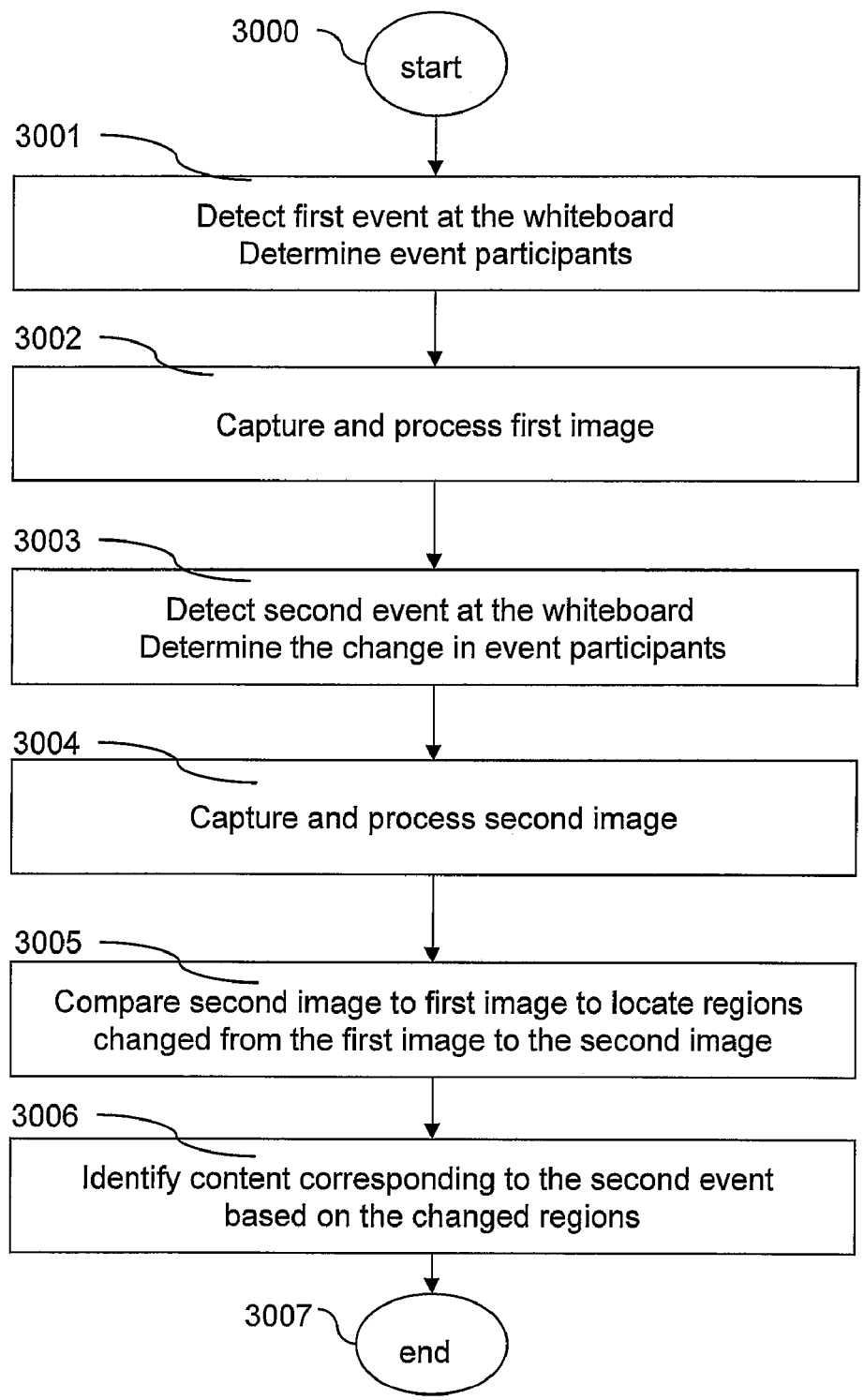

system for collaborative sharing events and images

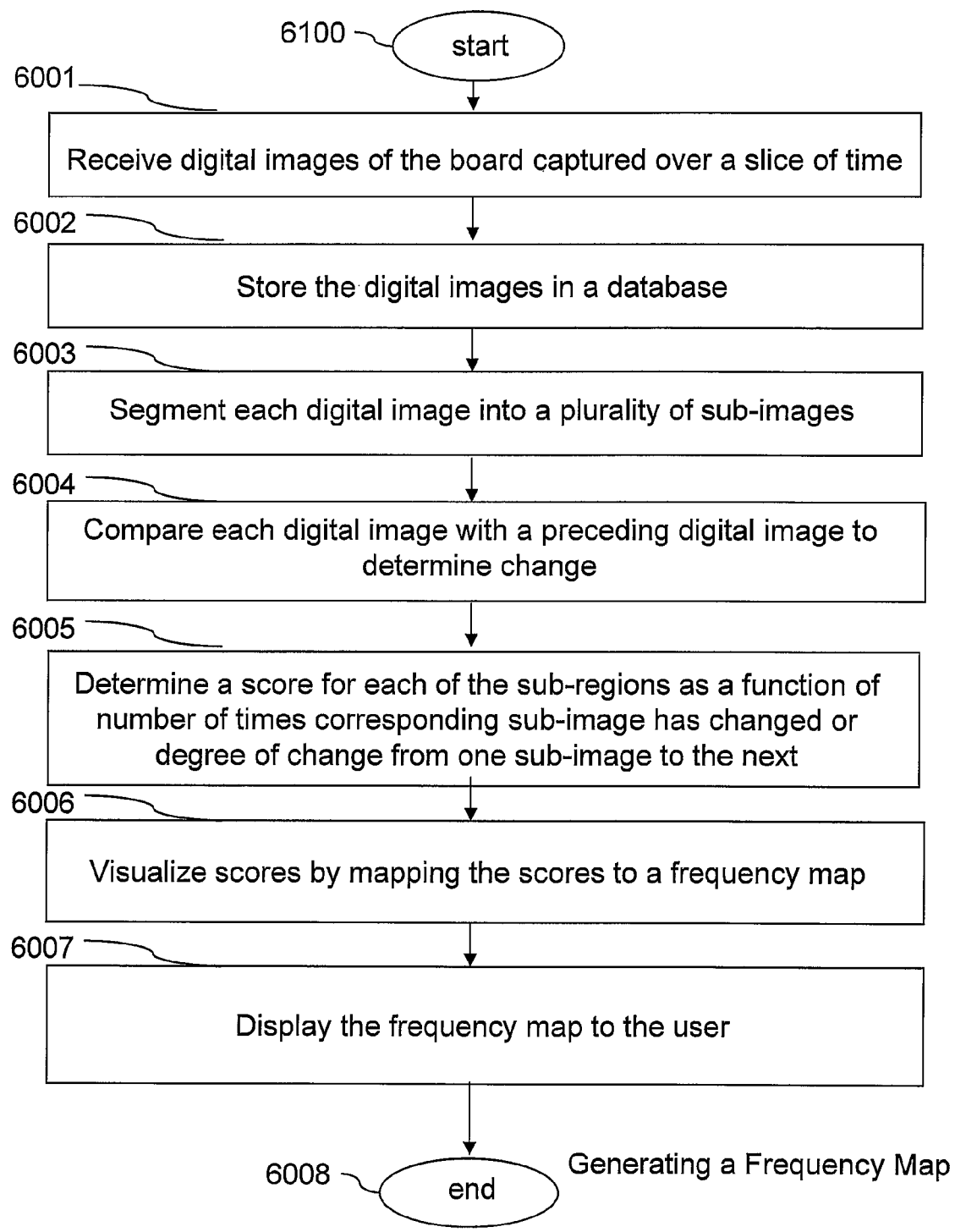

heatmap

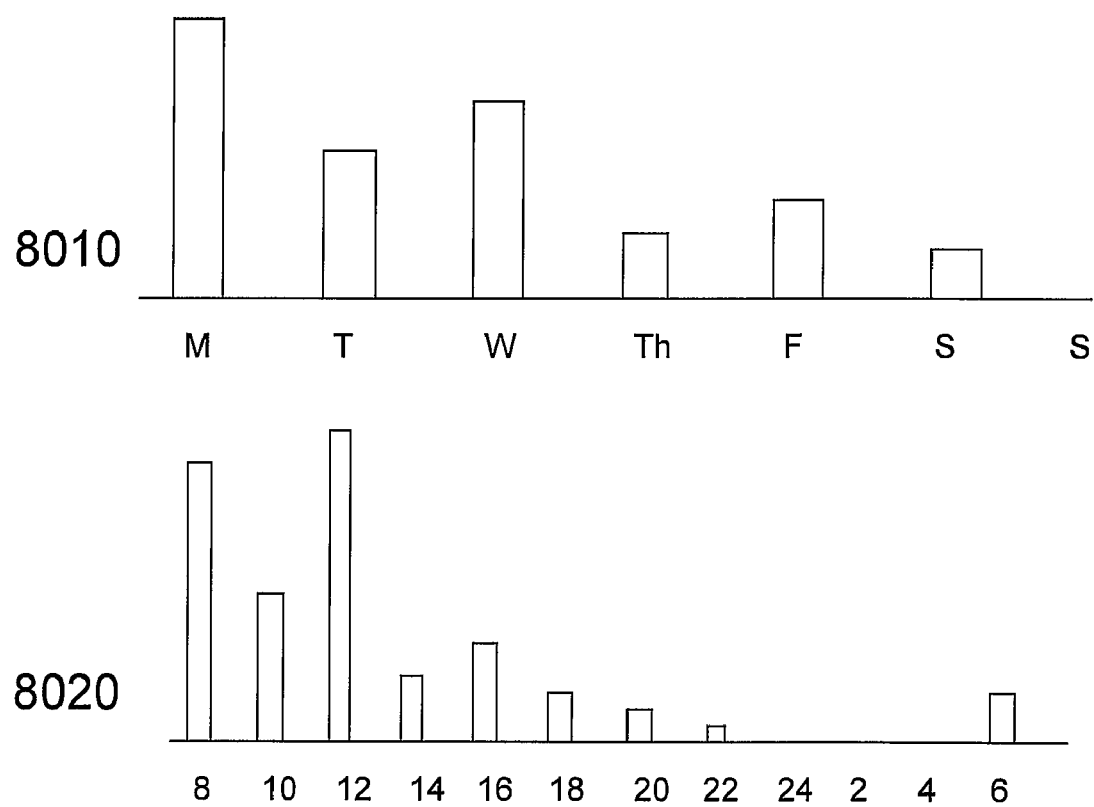

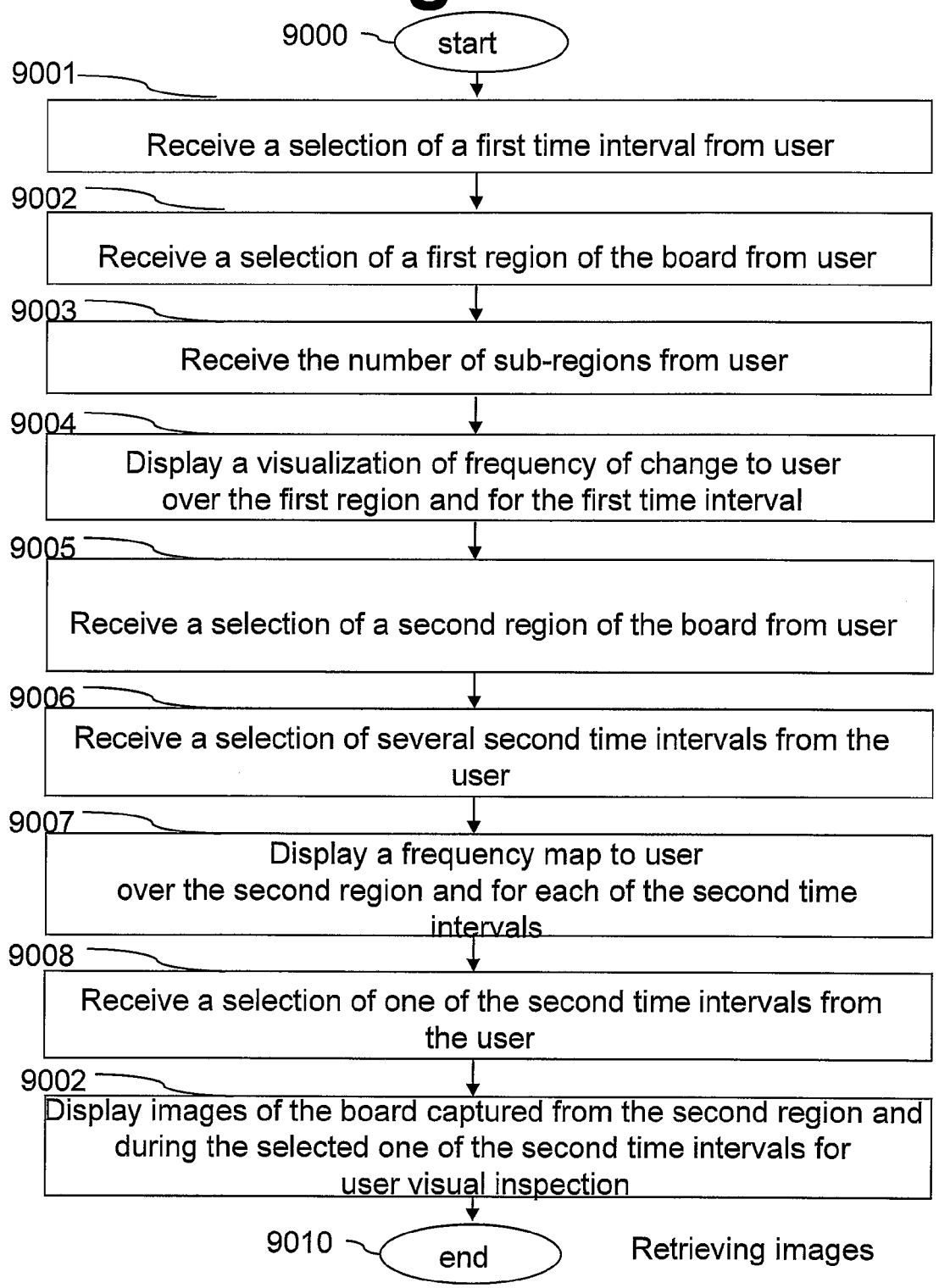

whiteboard with persistent writings

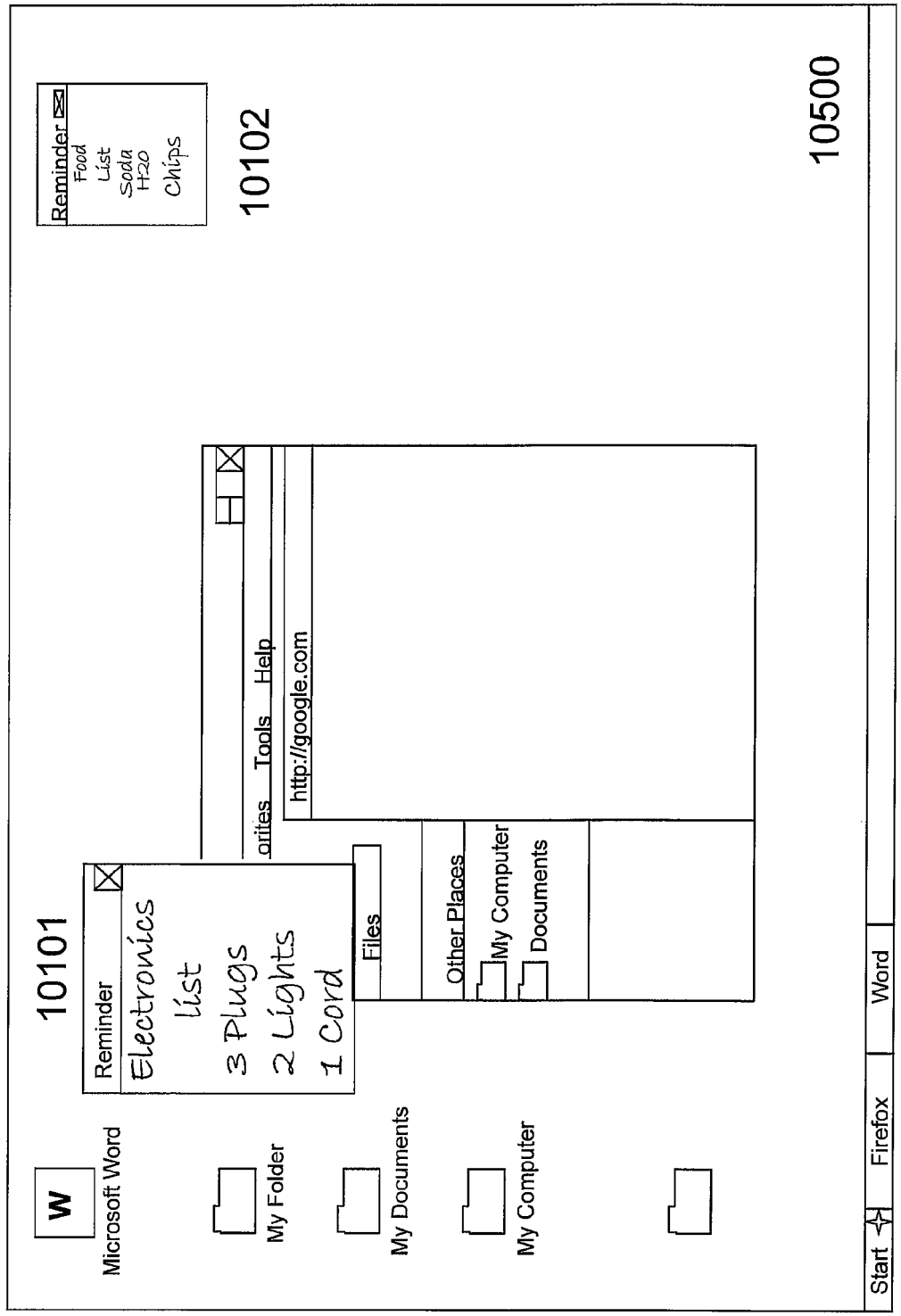

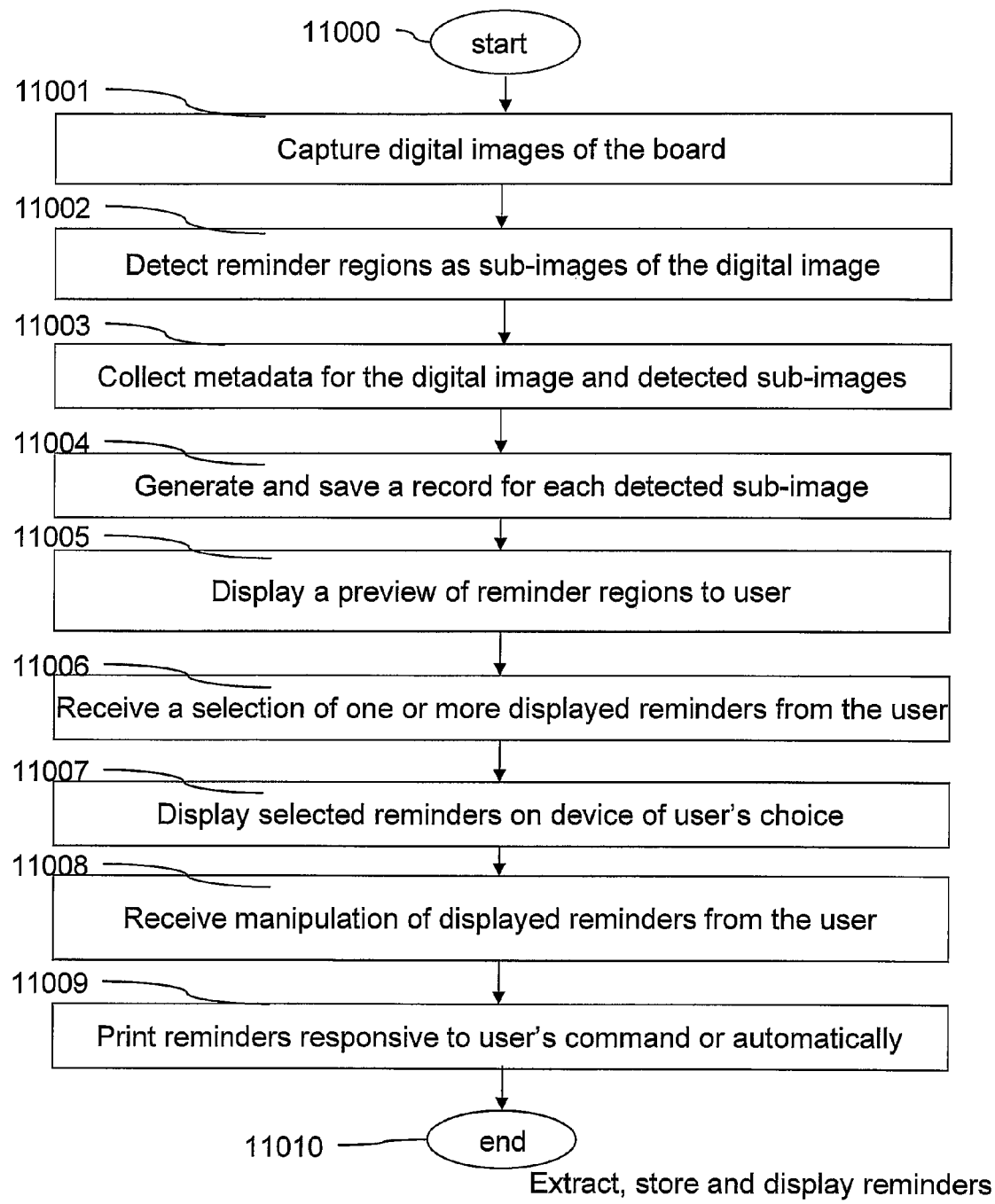
Extract, store and display reminders

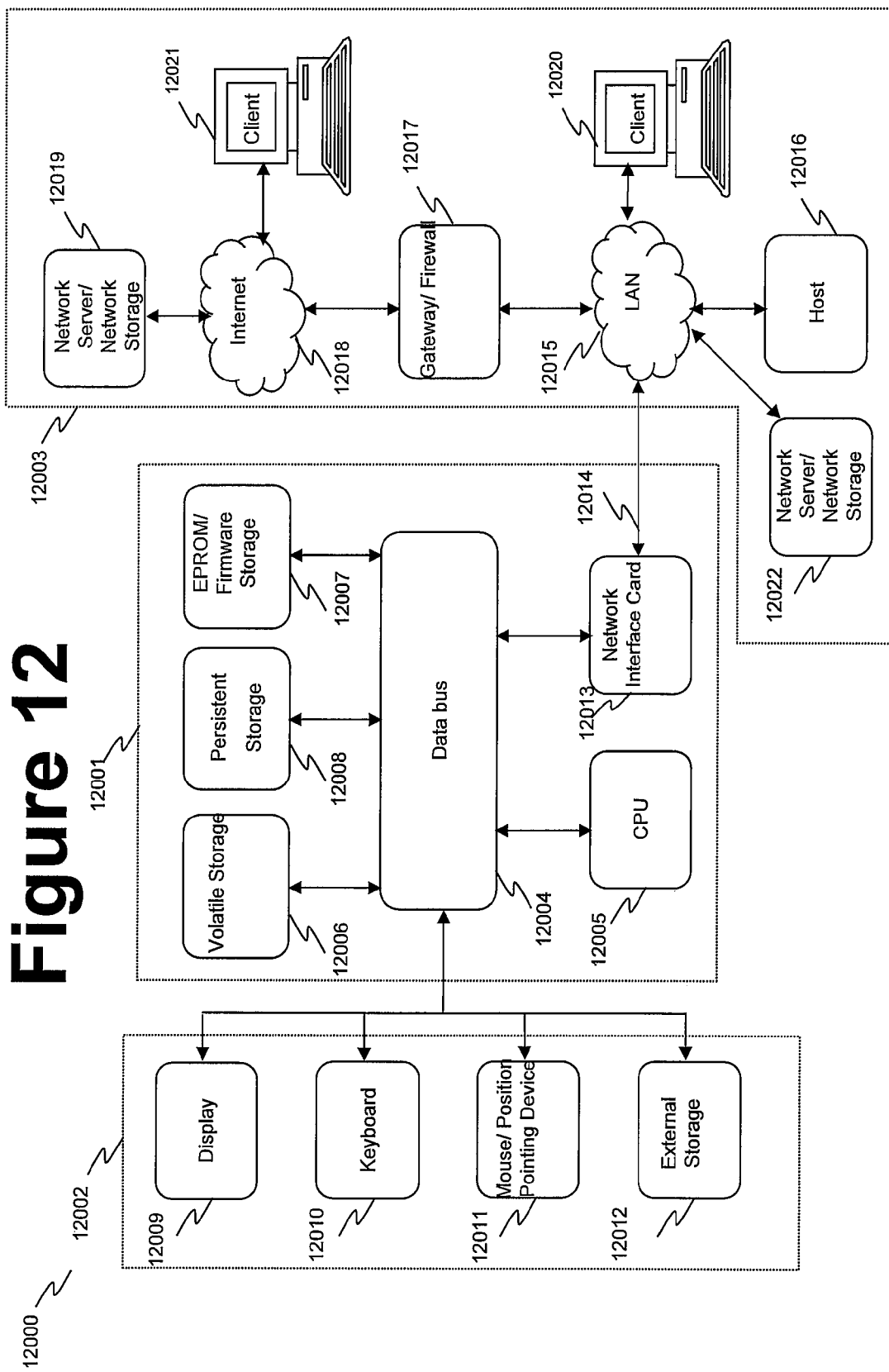

SYSTEM AND METHOD FOR FACILITATING THE USE OF WHITEBOARDS

DESCRIPTION OF THE INVENTION

1. Field of the Invention

This invention relates in general to methods and systems for facilitating and enhancing the use of a large non-electronic vertical display and, more particularly, to combining the use of the display with digital photography, fusing data streams from various sensors, and spatial data processing to facilitate and improve the desirable functionalities and features that are peculiar to a large non-electronic vertical display such as a whiteboard.

2. Description of the Related Art

Large vertical displays have high collaborative value. Large vertical displays, such as whiteboards, support a multitude of collaborative activities in a wide spectrum of fields that range from publishing, creative design, and software development to surgery and medicine. Research regarding collaborative activities has shown that whiteboards significantly improve communication in these various fields. For example, one study regarding software development showed that while software developers are rooted in the written form of their code, they often draw diagrams representing the code. The study further showed that software developers used traditional whiteboards for understanding an existing code and for ad-hoc meetings to resolve design impasses by soliciting cooperation of coworkers. Another study in a trauma center of a hospital showed that traditional handwritten whiteboards improved communication in noisy environments where oral communications were subject to frequent interruptions.

Collaborating users can quickly externalize an idea or concept by writing or drawing on the board to facilitate understanding among collaborators and provide a conversational artifact to ground subsequent discussion. For example, one user can quickly sketch a process follow diagram to convey the high-level design of system and later guide the discussion using gestures and deictic references. Whiteboards also provide effective support for brainstorming and associated creative activities such as reflection and reinterpretation because they provide a low-overhead shared work surface that allows information to be freely modified by all co-located users.

Several studies of workplace practice have shown the value of these benefits. One study of the use of whiteboard within a software team found that the display was a commonly used awareness and collaboration tool. Specifically, the researchers found that the users valued the ability of the display to provide a persistent summary of the team's current activities as well as a location and an artifact to facilitate and center the discussions. Further, because all users could easily edit the content of the board, they would often take stake and responsibility of the information contained on the display. Other work has shown that just within the domain of software development many collaborative tasks are performed using vertical displays. These collaborative tasks span a large spectrum from design activities, to training, to even communicating the features and functionality of the software with customers.

One area of research detects user activity near an electronic whiteboard and uses the information about the activities of the users to make implicit assumptions about interaction of the users with the whiteboard. Some studies of engineering design teams have shown that engineers engaged in informal meetings would cycle between phases of drawing and analysis and these cycles corresponded with changes in the physical proximity of the engineers to the whiteboard. The users would stand close to the board when they were writing, further back when discussing the written material, and even further back when engaging in meta-discussions. Therefore, based on the distance of where the user is standing from the whiteboard, the whiteboard infers the action being performed. As mentioned above, these studies pertain to electronic whiteboards that require special electronic styli and trays for holding the styli.

Drawing and writing on a whiteboard is faster and easier than performing the same functions using a computer screen. Therefore, a whiteboard is considered to have a lower overhead of user effort and training when compared to a computer screen. Untrained and distracted users may walk up to a whiteboard and focus on quickly sharing their ideas in a transient and on-demand interaction without prior training and without having to first learn how to use an electronic equipment. Whiteboards also allow information to be persistently visible even after the collaboration has ended. The persistence of the information facilitates activity coordination and awareness of task progress. For example, a list of action items can be left on the display and crossed off as they are completed. Additionally, the whiteboard is a simple tool and like most other simple tools it is sturdy and immune to the afflictions of high-tech tools. The information on a whiteboard is not affected by loss of electrical power, hardware malfunction, or faulty software. On the other hand, using a computer screen, or an electronic equivalent of a whiteboard, requires some degree of training. If a computer display is used for writing and drawing, the display is generally not as large as a whiteboard and is usually personal to one user while when using a whiteboard, one user's phrases or sketches can be readily modified by other users, enabling ideas to evolve and mature quickly. Further, an electronic device is not always present or turned on, is more costly than a non-electronic whiteboard and is subject to breakdown and sudden loss of information.

Some prior research has investigated the interaction between large displays and desktop computers allowing users to interact with large displays or other shared work surfaces, such as a hallway wall, using a traditional desktop computer and a supporting interface. One example of such prior research, allows a remote user to add content to a remote physical whiteboard using a desktop application that provides a live feed of the remote whiteboard and a ceiling mounted projector that projects the user annotations on the remote whiteboard. This system requires the use of a projector. Further, any sharing of the information is carried out only at the whiteboard.

Another prior area of research involves developing systems that allow users to perform actions using the physical whiteboard as an interaction surface. One example uses marking artifacts, or tags, that can be placed directly on the large display. Such markings could be used to assign tasks, to update status, or perform other functions. The tags include distinctive codes that are visually decodeable by a camera that is zoomed on the artifact. In another example, a user could place a marking artifact on the display to request a picture of the display's content to be saved and stored for later retrieval. This system requires active parsing of the whiteboard content, the codes and the tags or tokens that are placed on the whiteboard.

Large vertical displays are erased and rewritten over time. The other side of the benefit of the ability to erase a whiteboard is the drawback that the erased information is lost. Over time, most of the information on the whiteboards is erased and re-written. Even, the information that is not erased may simply fade away. Therefore, any information written on a whiteboard is susceptible to being lost over time.

Accordingly, the advantages of the non-electronic large vertical displays, such as whiteboards, are tempered by a key weakness that is the inability to preserve the history and context of activities that are reflected in the writings on the whiteboard. During a particular discussion, previous writings and drawings may be erased or modified as the discussion develops. As a result, the information left behind on a whiteboard may be insufficient for others to understand what was discussed, which problems or issues were solved or created, if any work planning decisions were made, and much more. Therefore, researchers observing the use of whiteboards often find that users spend a significant amount of time reconstructing information and repeating past discussions just to reestablish context.

Large vertical displays are used in part for persistent writings. One feature of the whiteboards is that they are used in part for writing persistent reminders of to-do items, important ideas, telephone lists and the like. Users often write notes to themselves on whiteboards so that they will be reminded of particular events and ideas. These reminder notes reduce the amount of display space available for other uses because the reminders tend to persist on the display for long periods of time. Telephone lists are another example of writings that tend to persist. Erasing the reminders and the telephone lists can free up space on the whiteboard. However, erasing causes the person to lose the information.

The electronic whiteboards can save the persistent writings or make space on a full board by moving the contents to the left and right of board center when the board senses that a user is approaching. However, electronic whiteboards lack the low operating overhead and the ease of use of the non-electronic whiteboards that were discussed above.

SUMMARY OF THE INVENTION

Aspects of the present invention are directed to methods and systems that substantially obviate one or more of the above and other problems associated with conventional techniques recited above.

Large displays such as a whiteboard have a high collaborative value, and the non-electronic nature of whiteboards provides low cost, low overhead for training and use and high reliability. On the other hand, the information of a whiteboard is generally only available at the whiteboard and the whiteboard may be locked in one person's office. Further, almost all information written on the board is erased and lost over time. Another drawback of none-electronic whiteboard is that persistent writings on the board take up board space and reduce the utility of the board for collaborative activity.

Aspects of the present invention provide automatic detection and sharing of the information created on a whiteboard during a collaborative activity session, archival and preservation of history of the information such that non-sequential access to particular episodes is facilitated, and detection, archival and presentation of persistent writings on the board. As a result, the information of the board is distributed to the relevant collaborators. Further, the writings and the history of the writings are preserved in an easily accessible manner such that the board may be erased without loss of information.

Aspects of the present invention address automatic detection and sharing of information created on a whiteboard during collaborative activities.

Aspects of the present invention describe a method and a system that can automatically detect a collaborative activity taking place at a whiteboard and make available those regions of the whiteboard that were modified during the collaborative activity session to some or all of the collaborators.

Aspects of the present invention provide non-sequential access to whiteboard activity via aggregate visualizations.

These aspects address loss of history and context of writings on a whiteboard and general loss of various types of information written on the whiteboard that occur over time due to the ephemeral nature of writings on a regular whiteboard.

Aspects of the present invention capture whiteboard images digitally to preserve information that would otherwise be lost when the whiteboard is erased. As the archive of captured images grows, it becomes progressively harder to find older images. Aspects of the present invention provide methods and systems for managing a collection of images that organizes the information in the images based on patterns of change. The images are grouped based on content analysis and metadata, and the users are allowed to filter the collected images based on interactions with visual representations of these groupings.

To address the loss of history and context of the activities that are reflected in the writing on the whiteboard, the content of whiteboards may be preserved and archived in the form of digital photos taken from the whiteboard content. After capturing the content of a large display, aspects of the present invention provide contextual information about past collaborative activities. For example, the history of how content was changed over time may be used for understanding how an idea evolved through the collaboration or for finding ideas that were discussed but not pursued. Aspects of the present invention provide the history of the whiteboard and how the content of the whiteboard changed and evolved over time. The identity of the collaborators who participated in the collaboration or contributed to it may also be archived together with the archived images as metadata.

Aspects of the present invention provide methods and systems for reusing persistent writings and reminders from whiteboards.

Aspects of the present invention provide methods and systems through which users can semi-automatically or automatically select regions of their whiteboards that represent reminders or other persistent writings. The reminder regions can be displayed as overlays on the desktop and continue to serve as reminders even after they've been erased. Moreover, by transfer of the reminders to the user desktop, the reminders can be used when the user is not looking at the whiteboard or is out of the office. The reminders may be moved and re-sized, and selected reminder regions may be hidden after the reminders have been transferred to the desktops.

Aspects of the present invention provide a method and a system for automatic transmission of content from a board to users of the board where the users are participating in development of the content on the board. The method includes identifying one or more users present at the board as a user entity, demarcating an event according to the user entity present at the board, where a first event changes into a second event when the user entity changes through leaving of some of the users or arriving of new users and the first event ends when all of the users leave and activity at the board stops, detecting a change in the content of the board corresponding to one of the events, and transmitting changed regions of the board only to the user entity present at the board during the event that corresponds to the detecting of the change in the content of the board. The detecting of the change in the content of the board may include comparing a first digital image of the board captured prior to the event to a second digital image of the board captured after a beginning of the event, and detecting the changed regions of the board as regions related to areas of the board having their content modified from the first digital image to the second digital image. The one or more users in the user entity may transmit the changed regions to others outside the user entity. The system includes a database for receiving and storing data collected at the board, where the data includes images of the board and identity of the one or more contributors detected at the board, one or more processors for determining events occurring at the board, where each of the events is defined by the identity of the one or more contributors detected at the board, and determining content associated with each event, where the content associated with each event includes a portion of the image of the board modified during the event. The system also includes input and output interfaces for transmitting the content associated with each event to personal computing devices of the contributors to the event. Each of the events may be a personal event including a sole contributor or a collaborative event including two or more contributors. A personal content includes the content detected as having been modified on the board after a personal event and a collaborative content includes the content detected as having been modified on the board after a collaborative event. The personal content is transmitted to a personal electronic computing device associated with the sole contributor to the personal event being associated with the personal content. The collaborative content is transmitted to the personal electronic computing devices associated with the contributors in the collaborative event being associated with the collaborative content. The system may also include a digital camera for capturing the images of the board, and one or more sensors for detecting human activity indicators at the board.

Aspects of the present invention provide a method for automatic detection of collaborative content created on a board. The method includes detecting a collaborative event as presence of collaborators near the board, detecting change in content on the board, determining the collaborative content by determining a relationship between the change in the content on the board and the collaborative event, and storing the collaborative content.

Aspects of the present invention provide a system for automatic detection of collaborative content on a board. The system includes one or more sensors for detecting a collaborative event at the board, a database for receiving and storing data collected at the board, the data including the content on the board and indicators of the collaborative event at the board, and one or more processors for determining the content on the board being related to the collaborative event as the collaborative content. The collaborative content is determined from a relationship between a change in the content on the board and the indicators of the collaborative event.

Aspects of the present invention provide a method for visualizing change over time of content of the board in a non-sequential manner. The method is adapted for permitting a user to take advantage of user episodic memory for locating content created or modified by the user on the board. The method includes retrieving images of the board captured over a slice of time, each image having been segmented into a plurality of sub-images corresponding to sub-regions of the board, comparing each image with a preceding image to determine a score for each of the sub-regions as a function of a change of the sub-image corresponding to the sub-region from one image to the other, visualizing scores by mapping the scores to a frequency map, and displaying the frequency map to the user.

Aspects of the present invention provide a system for visualizing change over time of content of the board in a non-sequential manner. The system is adapted for permitting a user to take advantage of user episodic memory for locating content created or modified by the user on the board. The system includes an input interface for receiving images of the board captured over a slice of time and segmented into a plurality of sub-images corresponding to sub-regions of the board, one or more processors for comparing each image with a preceding image to determine a score for each of the sub-regions as a function of change in the corresponding sub-image from one image to the other, a visualization module for visualizing scores by mapping the scores to a frequency map, and an output interface for displaying the frequency map to the user.

Aspects of the present invention provide a method for extracting persistent reminders from contents of a board. The method includes receiving an image of the board, detecting sub-images of the image corresponding to the persistent reminders as detected sub-images, extracting the detected sub-images as extracted sub-images, and storing the extracted sub-images.

Aspects of the present invention provide a system for extracting persistent reminders from contents of a board. The system includes an input interface for receiving images of the board, a database for storing a history of the board preserved as the images of the board captured over a period of time, the history of the board being utilized for identifying writings having persisted on the board, and one or more processors for detecting sub-images of a image corresponding to the persistent reminders as detected sub-images and for extracting the detected sub-images as extracted sub-images.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or its application.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 2A shows a flowchart of a method of detecting collaborative content, according to aspects of the present invention.

FIG. 2B shows a flowchart of a method of automatic detection and dissemination of content and context of a collaborative activity conducted by using a whiteboard, according to aspects of the present invention.

FIG. 3B shows a flowchart of an exemplary method of detecting the modified portion of the whiteboard image, according to aspects of the present invention.

FIG. 5A, FIG. 5B, FIG. 5C and FIG. 5D show an exemplary view of captured images shown to a particular user, according to aspects of the present invention.

FIG. 6 shows a flowchart of an exemplary method of generating a frequency map of content modification on a whiteboard, according to aspects of the present invention.

FIG. 8 shows exemplary one-dimensional frequency maps, or timelines, depicting frequency of change of content on a whiteboard, according to aspects of the present invention.

FIG. 9 shows a flowchart of an exemplary method of retrieving images from an image database using the frequency of change, according to aspects of the present invention.

FIG. 10A, FIG. 10B, FIG. 10C and FIG. 10D show a schematic depiction of extracting reminders from images of whiteboards and displaying the images as overlays on a personal device, according to aspects of the present invention.

FIG. 11A and FIG. 11B show flowcharts of a method of extracting reminders from images of whiteboards and storing or displaying the reminders as overlays on an electronic display of the user, according to aspects of the present invention.

FIG. 12 illustrates an exemplary embodiment of a computer platform upon which the inventive system may be implemented.

DETAILED DESCRIPTION

Figure 1A:
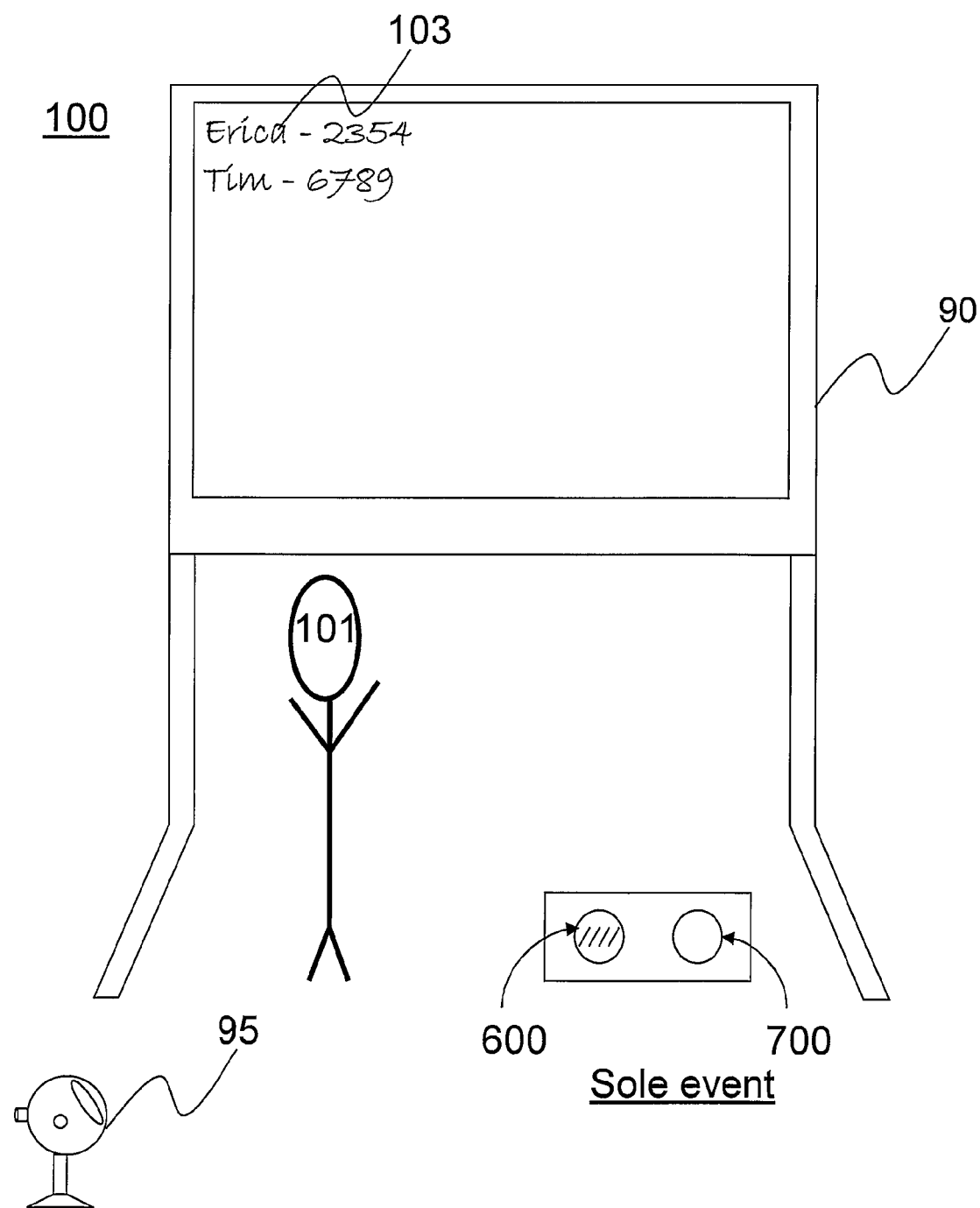
FIG. 1A, FIG. 1B, FIG. 1C and FIG. 1D show a schematic depiction of automatic detection and dissemination of content and context of a collaborative activity conducted by using a whiteboard, according to aspects of the present invention.

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of software running on a general purpose computer, in the form of a specialized hardware, or combination of software and hardware.

Throughout the present specification, the term "whiteboard" is used to denote a large surface such as a whiteboard or a blackboard that is used for drawing or writing by hand and may be readily erased. The surface may be substantially vertically oriented, may be substantially horizontal or have another orientation convenient for writing and drawing. The "whiteboard," as used in the present specification, may be a regular whiteboard also known as a markerboard, a dry-erase board, a dry-wipe board or a pen-board that has a glossy surface, most commonly colored white, where non-permanent markings can be made. The "whiteboard," as used in the present specification, may also refer to a chalkboard. The markings on the whiteboard may be made by a special marker pen containing removable ink, with chalk, or with another type of marker whose markings are easily erasable. Whiteboards may be constructed with melamine resin, polyester coated steel or from enameled steel. The term "whiteboard" within the meaning of the present application does not apply to computer software applications that simulate whiteboards and are referred to as virtual whiteboards. An electronic whiteboard, that is in effect a special purpose computer, may be photographed just as a non-electronic whiteboard. Therefore, while the aspects of the present invention may be applied to electronic whiteboards, they do not depend upon the electronic nature of the electronic whiteboards.

Various aspects of the present invention include an automatic detection, archival and sharing of information that is created during a collaborative activity that takes place at a whiteboard and includes writing and drawing on the whiteboard.

Aspects of the present invention automatically detect and capture content created on a whiteboard along with relevant context. The relevant context includes the identity of the individuals who participated in the collaboration that gave rise to the content created on the whiteboard. The content and context information are then automatically made available to the participating collaborators via a web-based user interface (UI). The UI may also support the ability to search and browse through capture history as well as the functionality to share collaboration histories with peers. As a result of the collection and dissemination of the content and context information to the collaborators, the overall value that a whiteboard provides to supporting collaboration in the workplace increases.

FIG. 1A, FIG. 1B, FIG. 1C and FIG. 1D show an exemplary schematic depiction of automatic detection and dissemination of content and context of a collaborative activity conducted by using a whiteboard, according to aspects of the present invention.

FIG. 1A, FIG. 1B, FIG. 1C and FIG. 1D respectively include views 100, 200, 300 and 400 that show the timeline of events as they occur in various related locations as described below. These events are used to explain one exemplary operation of the automatic detecting, archiving and sharing method and system of the aspects of the present invention.

FIG. 1A shows the first view 100 and includes a whiteboard 90 and a camera 95. The camera 95 is directed at the whiteboard 90 and obtains images of the content of the board. In view 100, a first user 101 approaches the whiteboard 90 and creates a first content 103 by writing or drawing on the whiteboard. The exemplary content 103 includes telephone numbers of Erika and Tim and is created on the top left corner of the board. The first content 103 is not collaboratively created. Rather, this content is created by the first user 101 alone. The first content 103 is a personal content created during a personal or sole event.

Figure 1B:
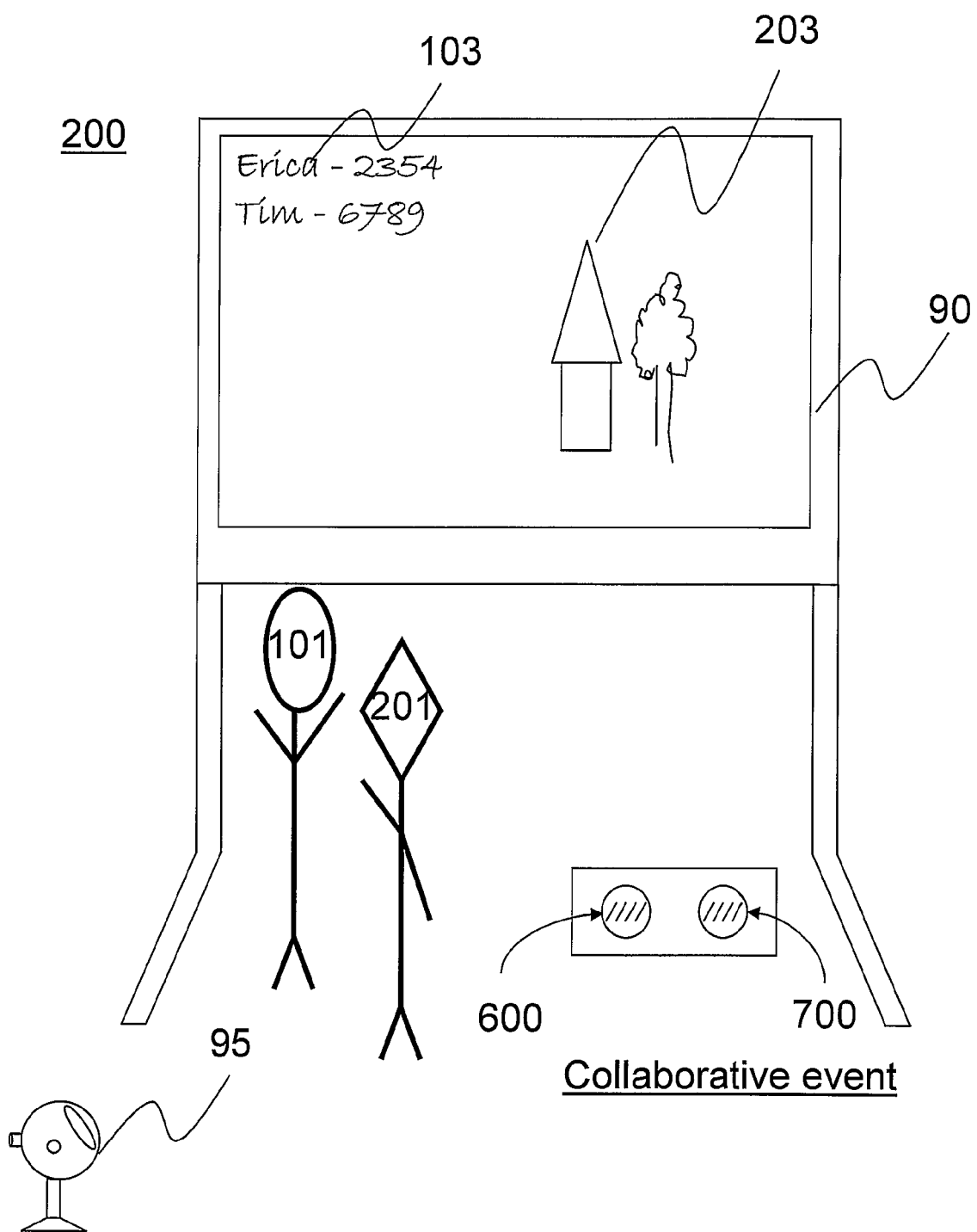

FIG. 1B shows a second view 200 that occurs later in time. In view 200, a second user 201 approaches the whiteboard 90 while the first user 101 is still at the whiteboard. While both the first user 101 and the second user 201 are at the whiteboard, a second content 203 is created by one of the users or by cooperation of both users 101, 201. The second content 203 may be created by either of the first or second users or may include contributions from both. Nevertheless, because this content is created at time 200 while both users are present at the board, the second content 203 is presumptively created as a product of collaboration between the first user 101 and the second user 201. Therefore, the second content 203 is identified by the users that were present at the time of creation of the content and not by the user or users who created the content and because more than one person was present, the second content 203 is considered a collaborative content.

Figure 1C:
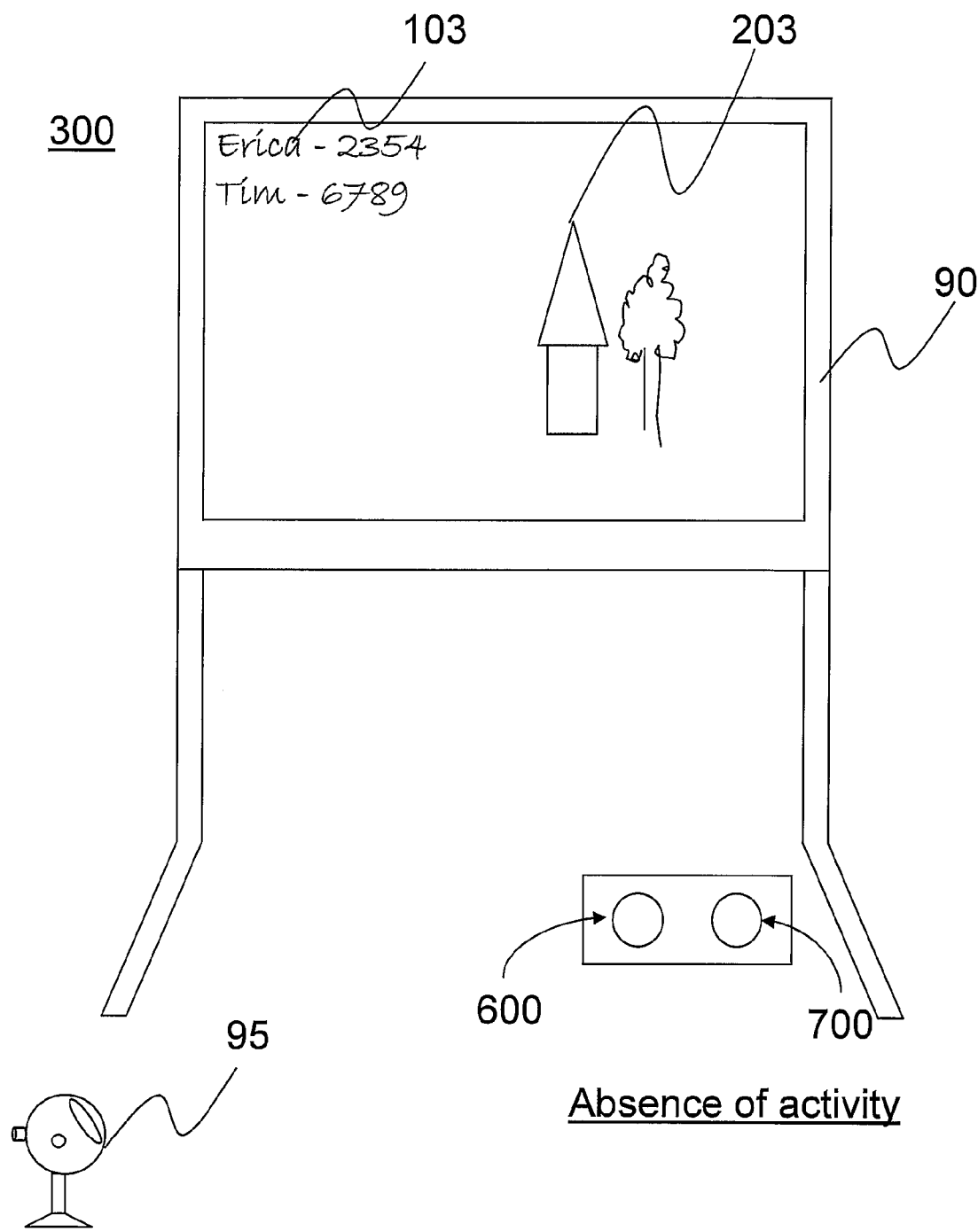

FIG. 1C shows a third view 300 that occurs after the time of the second view 200. In view 300 both users 101, 201 have left the whiteboard. Further, in view 300 both the first content 103 and the second content 203 remain on the board 90.

Figure 1D:
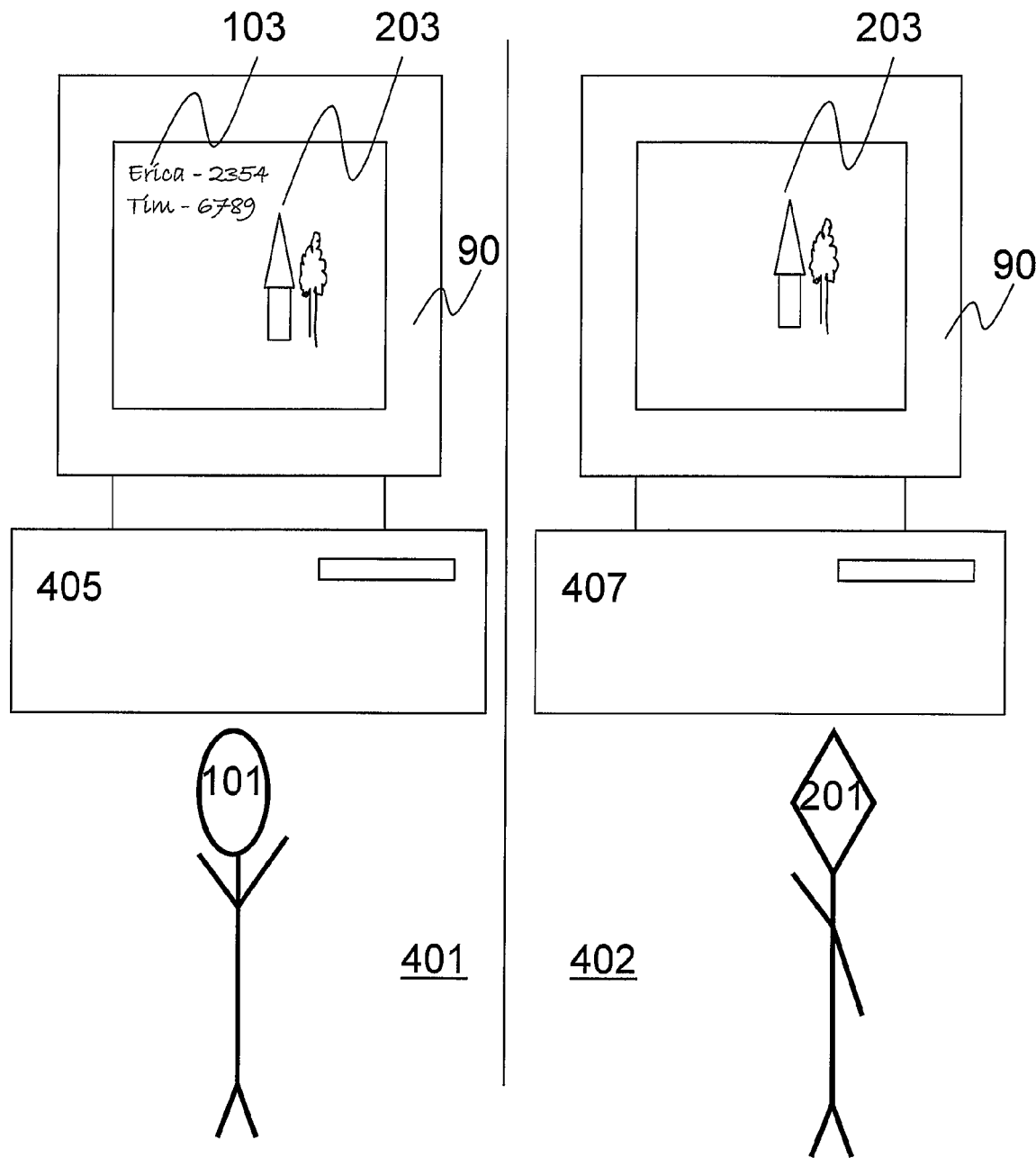

FIG. 1D shows a fourth view 400 that occurs after the time of the third view 300. In view 400 each user 101, 201 has moved back to his respective office 401, 402. The first user 101 has a first personal computer 405 in his office 401. The second user 201 has a second personal computer 407 in his office 402. An image of the whiteboard 90 is shown to each user on the screen of the user's respective personal computer 405, 407. The first user 101 was present during the creation of both the first content 103 and the second content 203. Therefore, both the first content 103 and the second content 203 are provided to the first user 101 on the display or screen of the first personal computer 405 that belongs to the first user. The second user 201 was present only during the generation of the second content 203. Therefore, only the second content 203 is provided to the second personal computer 407 that belongs to the second user 201. In other words, the content and information that is redisplayed in user offices is determined based on the location of the re-display.

In the exemplary embodiment shown in FIG. 1D, the personal computers 405, 407 show the entire whiteboard 90 while displaying only the permitted content of the whiteboard to each user. In an alternative embodiment, the image displayed on the personal computers 405, 407 may be adjusted to show all of the whiteboard 90 or only the permitted portion of it. For example, the personal computer 407 in the second office 402, that displays only the collaborative content 203 may show only the portion of the board 90 including the collaborative content 203.

Further, each image shown on the display, or screen, of the personal computer may be enlarged, rotated, or otherwise manipulated by the user of the personal computer.

Each of views 100, 200, 300 that show the board 90 also includes a motion detector 600 and a collaboration detector 700. In view 100, where only the first user 101 is at the board, only the motion detector 600 is highlighted because motion is detected but collaboration is not detected. Collaboration includes sensing more than one person at the board. In view 200, where the first user 101 and the second user 201 are both at the board, both the motion detector 600 and the collaboration detector 700 are highlighted because both motion and collaboration are detected. In view 300, neither motion nor collaboration is detected and neither detector is highlighted.

In addition to the content 103, 203, various context related information such as the identity of the single user or collaborating users, the time of the creation of the content, or the location of the board may be associated with each piece of content as metadata and available to the user at his personal computer 405, 407.

FIG. 2A shows a flowchart of a method of detecting collaborative content, according to aspects of the present invention.

The method shown in FIG. 2A provides an overview. The method begins at 2100. At 2101, a collaborative event at the board is detected. In one aspect of the present invention, video streaming from a video camera directed toward the board is used to determine activity at the board. Other types of sensors may be used as well. At 2102, a change in content of the board is detected. The change in content is detected by comparing consecutive still photographs of the board, captured by a digital camera that is directed toward the board. At 2104, the user may optionally modify the content that is provided for his preview. At 2105, the method determines whether the collaborators have been identified or not. The identity of the collaborators may be determined in several automatic ways. If the identities of the collaborators are not known, at 2106, the user is given the opportunity to select the collaborators. If the identities of the collaborators are known or after the user selects the collaborators, at 2107, the collaborative content is shared among the collaborators by being disseminated to their personal devices in various forms including an email. At 2108, the process ends.

In one aspect of the present invention, different devices are used for detecting activity and for capturing board content. In one aspect, the same device, for example the same digital camera or the same video camera, is used for both stages of detecting activity or collaboration and detecting and capturing content. In one aspect, the capture of the images of the board is performed in an opportunistic manner and when a clear view is available for the camera. In one aspect, the last image is captured after a period has elapsed following sensing of no motion at the board.

Change of content, whether created independently by a sole writer or collaboratively by two or more writers may be detected and recorded in a database. The ability to detect meaningful collaborative change in the content of the board is arrived at by later correlating the change in the whiteboard content with motion of the writers and collaborators in front of the board. The association between the collaborative content and collaborators may be stored in the database or a personal file system. The collaborative content may or may not be sent to some or all of the collaborators or their associates.

FIG. 2B shows a flowchart of an exemplary method for automatic detection and dissemination of content and context of a collaborative activity conducted by using a whiteboard, according to aspects of the present invention.

The method begins at 2000. At 2001, activity, such as motion, is detected or sensed at or near the board. At or near the board refers to the general vicinity of the board. The activity is sensed or identified as a personal activity by one user. At 2002, a first whiteboard image is captured that includes the first content 103. Metadata including the identity of the first user 101 that is present at the time of creation of the first content is also captured. The first content is a personal content associated with the first user. At 2003, occurrence of the collaboration is detected or sensed at or near and in the general vicinity of the board. At 2004, a second whiteboard image is captured that includes the second content 203 together with relevant metadata indicating the occurrence and particulars of the collaboration at the whiteboard. The second content is a collaborative content associated with both the first user and the second user. At 2005, the absence of any sensed activity at the board indicates that the first user 101 and the second user 201 have left. Here, the second content may be determined from an image captured from the board after a period of time has elapsed and no activity has been sensed or detected at the board. At 2006, the first content and the second content 103, 203 are sent for being re-displayed to the first office associated to the first user and only the second content 203 is sent to the second office that is associated with the second user. At 2007, the method ends.

At 2001, and 2003, the sensing of the collaboration may be performed independently of identifying of the users. For example, motion sensors may be used to indicate activity without identifying the participants. In one aspect of the present invention, occurrence of a collaborative activity may be detected by analyzing audio streams. The system could apply amplitude thresholding techniques to detect that a conversation is taking place. These filters can be tuned to detect only the existence of human voice but not its contents so as to preserve the privacy of participants. Other sensors could provide useful data indicating collaboration as well. Vibration, motion, and weight sensors could indicate increased activity in the office that might correlate with collaborative discussions. These sensors do not identify the participants.

In various embodiments of the invention, identifying the participants of a session may be done either automatically or manually.

Automatic detection can involve analyzing camera streams to recognize participant faces. For example, each person may be identified by image analysis and recognition methods as the user approaches the board. In this case, the identification of the user or users precedes and therefore indicates the occurrence of a personal event or a collaborative event.

For automatic collaboration detection, a binary collaboration detector may be used that detects whether a particular user is present at the whiteboard or not. A binary collaboration detector may be implemented by fusing streams from a variety of sensors, including audio recorders, cameras, and vibration, weight, and motion sensors. Using such a federation of approaches improves accuracy.

Alternatively, at 2003, a wide range of people trackers may be used. The people trackers provide two pieces of information simultaneously: the occurrence of a personal or collaborative activity and the identity of the participants. When a people tracker is used for detecting the collaboration at 2003, then, at 2006, the appropriate portions of the whiteboard images can be automatically routed to all participants in the collaborative activity. One example of a non-camera-based people tracker for offices uses badges that are worn by the people. The badges transmit signals to a network of sensors embedded in the office environment. This type of system is an indoor locationing system. A number of other solutions involving active sensor solutions are also available that include Bluetooth tags, radio frequency identification (RFID) badges, or badges based on other technologies. Passive badges may also be used for people tracking. Passive badge systems typically involve users wearing RFID antennas and a networked infrastructure of readers. In one example, RFID readers embedded in doormats detect RFID antennas in user's shoes.

In an embodiment of the invention, if automatic detection is not available or is not desirable, the system can use a feedback interface to request that participants manually enter identifying information. Alternatively, the operator of the camera that is capturing the images may be asked to select the participants who were present at the collaborative session. The collaborative session is also referred to as the collaborative event. Therefore, the operator of the camera determines the re-display of the whiteboard images at 2006 based on the presence of the participants.

In the flowchart shown in FIG. 2B, capture of whiteboard content follows detection of activity at the board. Alternatively, whiteboard content may be captured at regular intervals. This method is particularly useful if the board is located in a common area that experiences continuous activity and its contents are often modified. For whiteboards located in personal offices, activity-triggered capture may be more economical.

Further, a final image corresponding to a personal or collaborative activity (2002 or 2004) may be captured after a period of time has elapsed and no activity has been sensed at the board. In this manner, the method assures that the captured image corresponds to the final condition of the board.

Figure 3A:
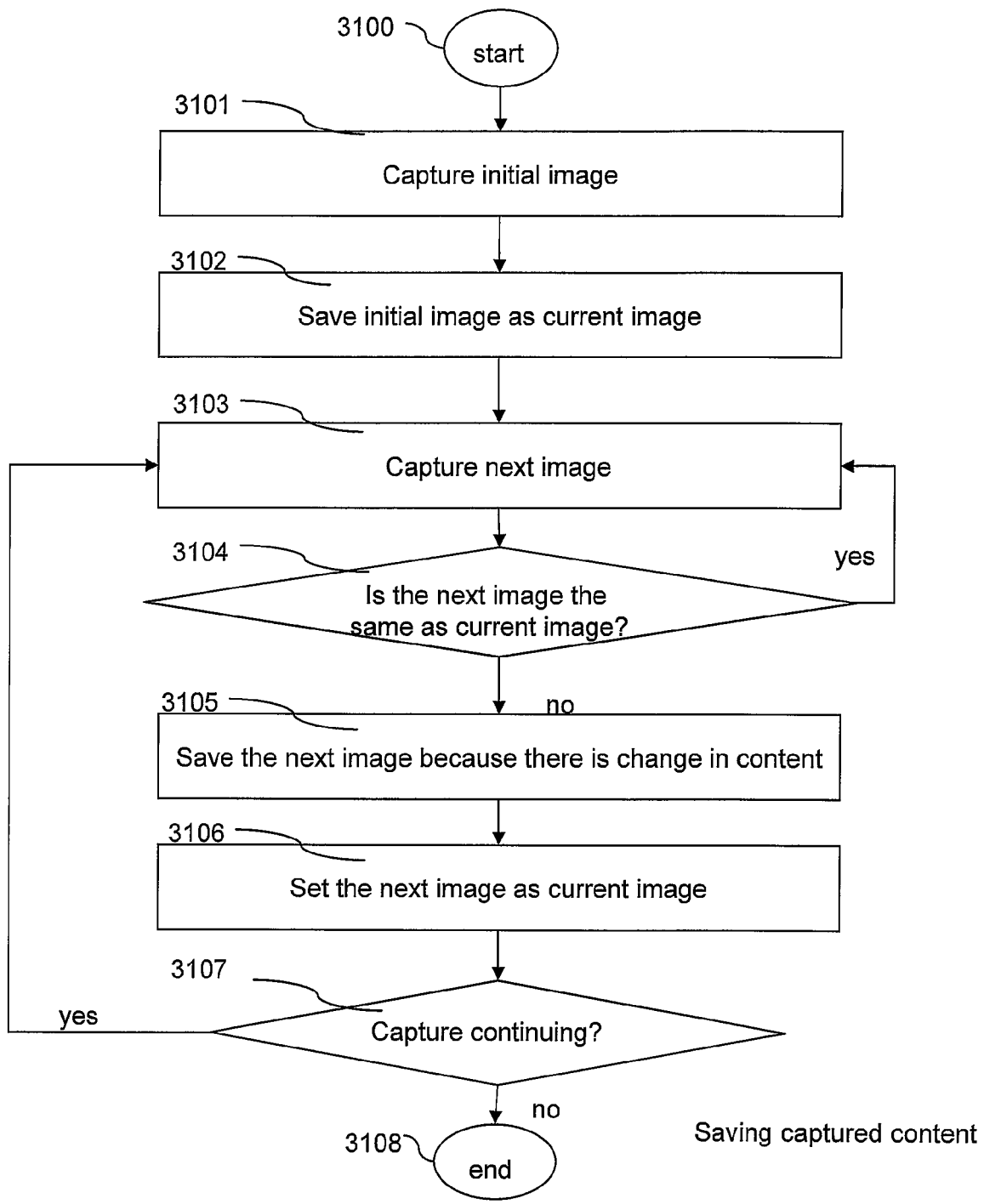
FIG. 3A shows a flowchart of a method of detecting change in content of the whiteboard and saving captured images, according to aspects of the present invention.

FIG. 3A shows a flowchart of a method of detecting change in content of the whiteboard and saving captured images, according to aspects of the present invention.

The method begins at 3100. At 3101 an initial image is captured from the board. At 3102, this initial image is set as the current image. At 3103, a next image is captured from the board. At 3104, the next image is compared to the current image to detect if there has been any change in content. If change is detected, then the next image is not the same as the current image and the process moves to 3103. If the next image and the current image are the same, the process moves back to 3102 to capture an additional image. At 3105, the next image is saved also because it is different from the current image and includes additional information. At 3106, the next image is set as the current image and the process is repeated as long as capture of images continues. Every time a next image is set as the current image, the process determines at 3107 whether capture is continuing. If capture has stopped, the process ends at 3108.

FIG. 3B shows a flowchart of an exemplary method of detecting the modified portion of the whiteboard image, according to aspects of the present invention.

In the system shown in FIG. 1B and FIG. 1C and in the method of FIG. 2B, the collaborative content 203 is only a portion of the content on the board 90 and, depending on how the camera is being used, the collaborative content 203 may form only a portion of the image that is captured from the whiteboard at step 2004 of the flowchart of FIG. 3B. At step 2006 of FIG. 3B, and in FIG. 1D, the collaborative portion of the image is identified and sent to the collaborators 101, 201 while the non-collaborative portion, corresponding to the personal content 103, is sent only to the sole creator 101 of this content. The flowchart of FIG. 3B shows one exemplary method of identifying the portion of the whiteboard image that corresponds to a particular event. The flowchart of FIG. 3B may be used for identifying a collaborative content corresponding to a collaborative event.

The method begins at 3000. At 3001, corresponding to a first time, an activity is sensed at the board and is recorded as a first event. The event participants are also identified and recorded. At 3002, a first image of the board is captured and processed. The first image corresponds to the first event. If the first event is not a scheduled event whose time boundaries are predetermined, then, the end of the event is not known and several images corresponding to the first event may be obtained. For events of indeterminate duration, an image captured closest to the end of the first event is determined to be the first image. At 3003, corresponding to a second time, a second event near the board is detected. The event participants are identified and recorded. At 3004, a second image is captured from the whiteboard and is processed. At 3005, the second image is compared to the prior image, which is the first image in this example, in order to determine whether there is a change in the content from one image to the next. The areas of the second image that have changed when compared to the first image correspond to the second event and are indicators of the second content. At 3008, these areas are used to identify the second content that corresponds to the second event is to be sent to the participants identified for the second event. At 3007, the method ends. The method also includes a feedback step that is not shown and may occur after any of the steps 3001-3005. At the feedback step, feedback is provided to the users by a collocated display or a personal computer located near the whiteboard.

The second event may be an independent event or a change in an ongoing activity at the whiteboard. An absence of activity after the first event is not an event because once the participants leave the board, the content is no longer modified and the process will not detect change of content. Otherwise, the second event may result from any change in the participants of the first event. The second event may result from a second person joining a first person at the board; it may result from one or more of the collaborators in the first event leaving the collaboration to yield a different mix of collaborators or to yield a personal event. The events are demarcated by their participants. Therefore, an image of the second event is compared to the image corresponding to the end of the previous event when the participants changed.

Further, detection of a second content (3007) has three prongs: 1) a change in the people participating at the board is detected which signifies a second event; 2) modification of the content on the board, coinciding with the second event, is also detected; and 3) the boundaries of the second content are deduced from the modified regions of the board.

The flowchart of FIG. 3B establishes the content corresponding to each event. The events are bounded by the change of participants at the board. The events may be sole or collaborative. Therefore, the content that is detected and disseminated by the method of FIG. 3B, may be sole content or collaborative content. Sole and personal are used to convey similar concepts in this description.

As described above, a collaborative content or collaborative modification indicates that the whiteboard was modified when two or more people were present near the board whether or not more than one person actually wrote or drew on the board. In other words, collaboration refers to the presence of the users at the board. Not all present users have to write or draw on the board.

In one aspect of the present invention, the creation of collaborative content may be detected by analyzing the images captured from the board. In order to detect the modification of the content created on the board, the method or system could utilize connected components labeling to detect large changing areas in images, by analyzing camera streams. The large time-varying areas in the field of view of the camera correspond to collaborative content created during the collaborative activity. Thus, in order to detect creation of collaborative content, the presence of the large time-varying regions is correlated with the presence of multiple people near the board. In one aspect of the present invention, infrared cameras that may reduce labeling errors may be used for detecting the modified content. If, after some period of such activity the whiteboard image has changed from a previously-known good image, the change constitutes evidence that the whiteboard was modified collaboratively.

The method or system of the present invention can detect changes made to a large display during a collaborative session using image differencing from video streams from one or more cameras directed toward the display. Using this technique, the system can automatically capture content created on the display, along with metadata that includes users participating in the collaborative activity as well as the time and location of the activity. The collaborative session is also referred to as the collaborative event.

The method or system of the present invention can provide feedback that it has recognized a collaborative activity via either collocated or proximate displays. Collocated displays could augment the whiteboard itself, for example via a projector. The system could also represent the same information on proximate displays, such as a nearby desktop.

Figure 4A:
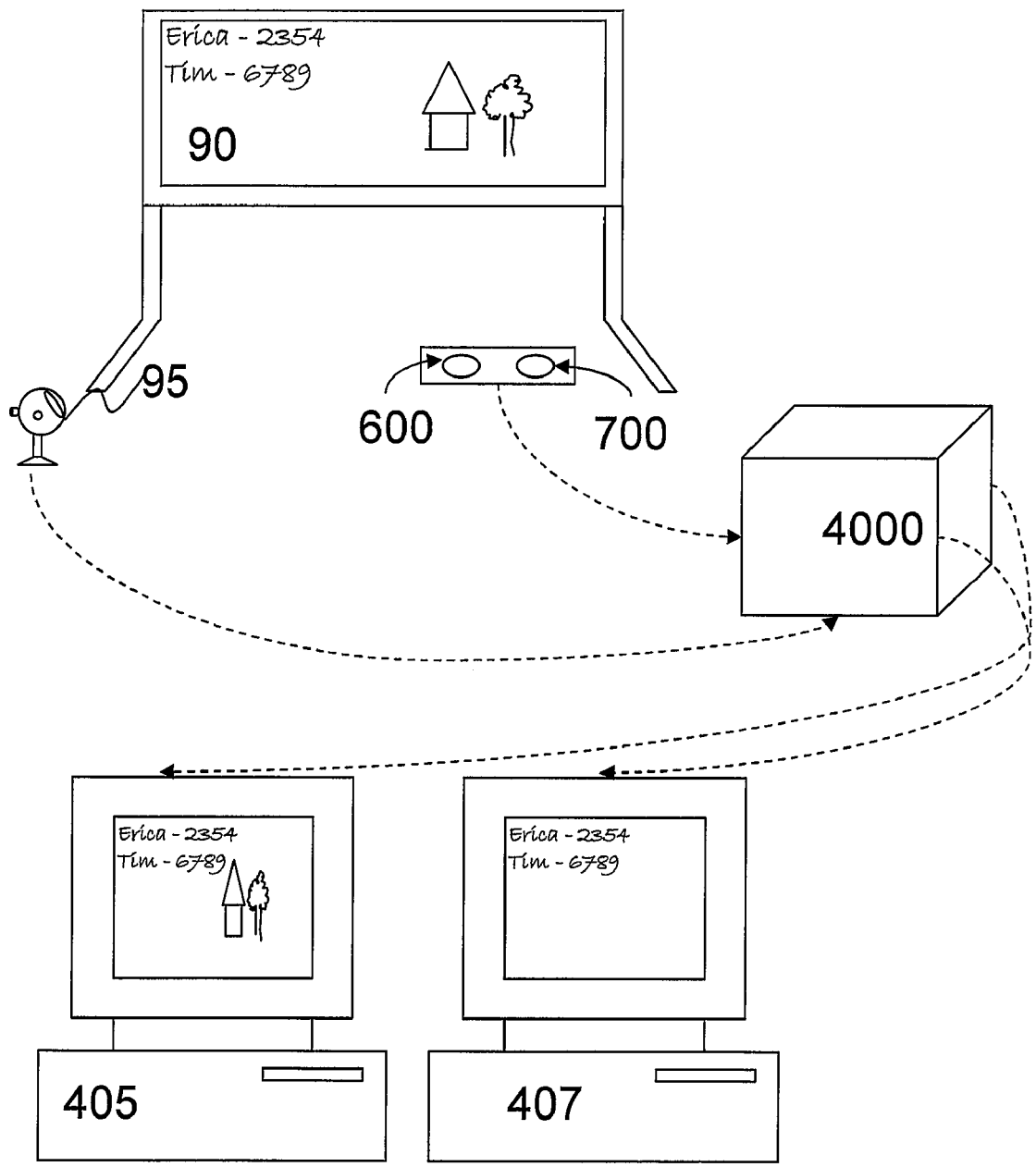
FIG. 4A shows a system for archiving and sharing collaborative information, according to aspects of the present invention.

FIG. 4A shows an exemplary system for archiving and sharing collaborative information, according to aspects of the present invention.

A collaborative system 4000 for archiving and sharing collaborative information, is in communication with the whiteboard 90, the digital camera 95, the motion and collaboration sensors 600, 700, and finally one or more personal computers 405, 407 of the users. The motion and collaboration sensors 600, 700 sense the presence of any activity or are more particular and can determine when more than one person is present at the whiteboard. The collaborative system 4000 receives data from the digital camera 95 and the motion and collaboration sensors 600, 700 and sends the appropriate content to the personal computers 405, 407 of the users.

The system 4000, which is configured to perform the methods of FIG. 2B and FIG. 3B, is capable of determining the collaborative portion of the content. The system can detect which portions of the display were modified when a collaborative event was taking place and which portions were not modified. The system then has the option of only collecting and archiving the collaborative portions of the whiteboard used for the collaboration during the collaborative event. This feature protects the personal portion of the content on the whiteboard, such as personal to-do lists, phone numbers, and the like, from being shared with peers. This feature can be overridden by the owner of the whiteboard to explicitly include arbitrary content for dissemination to users.

Figure 4B:
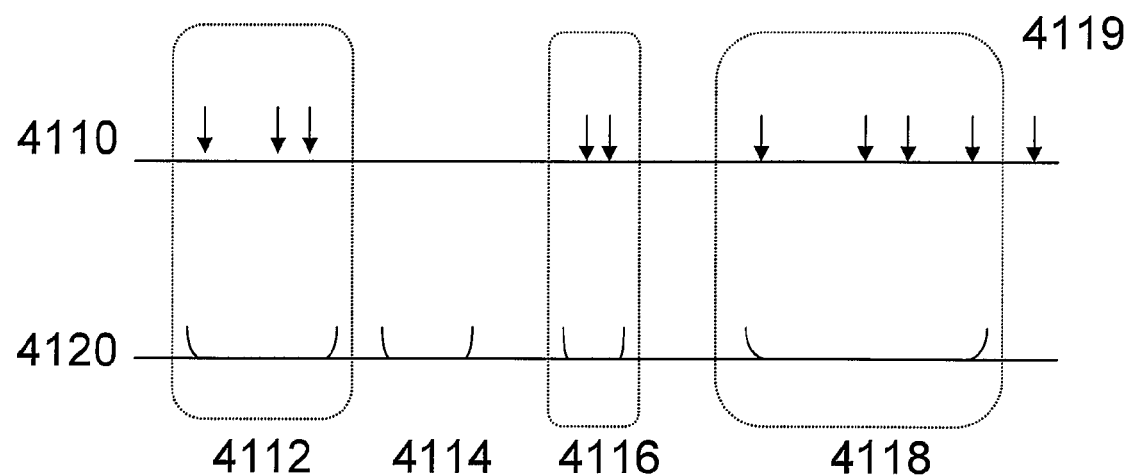
FIG. 4B shows a schematic depiction of the correspondence between events and images sensed and captured, according to aspects of the present invention.

FIG. 4B shows a schematic depiction of the correspondence between events and images sensed and captured, according to aspects of the present invention.

In FIG. 4B, two simultaneous and parallel timelines are shown as 4110 and 4120. The collaborative events detected at the board are shown along 4120 and capture of images from the board is shown along 4110. Four collaborative events 4112, 4114, 4116, and 4118 are shown along the timeline 4120. Images were captured for the events 4112, 4116 and 4118 as indicated by arrows along the corresponding timeline 4110. The collaborative event and the images may be recorded separately. However, their respective timestamps permit a method or a system of the aspects of the present invention to align each event with its corresponding images as shown by the dotted boxes surrounding the event and its images. There may be no image captured for some events such as the collaborative event 4114. On the other hand, there may be some images captured and saved, such as image 4119, which have no corresponding event recorded.

FIG. 5A, FIG. 5B, FIG. 5C and FIG. 5D show an exemplary view of captured images shown to a particular user, according to aspects of the present invention.

Figure 5B:
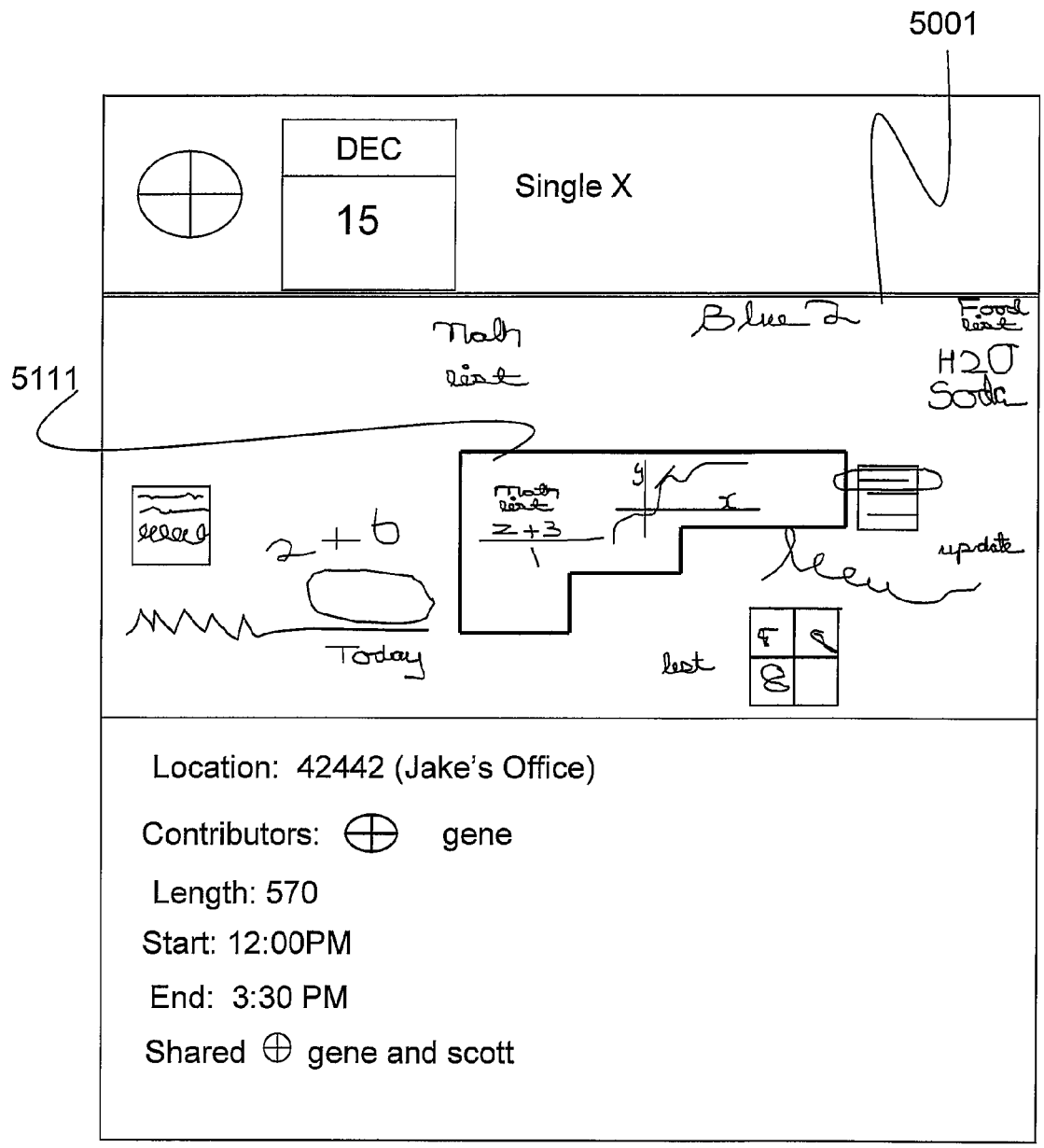
Figure 5C:
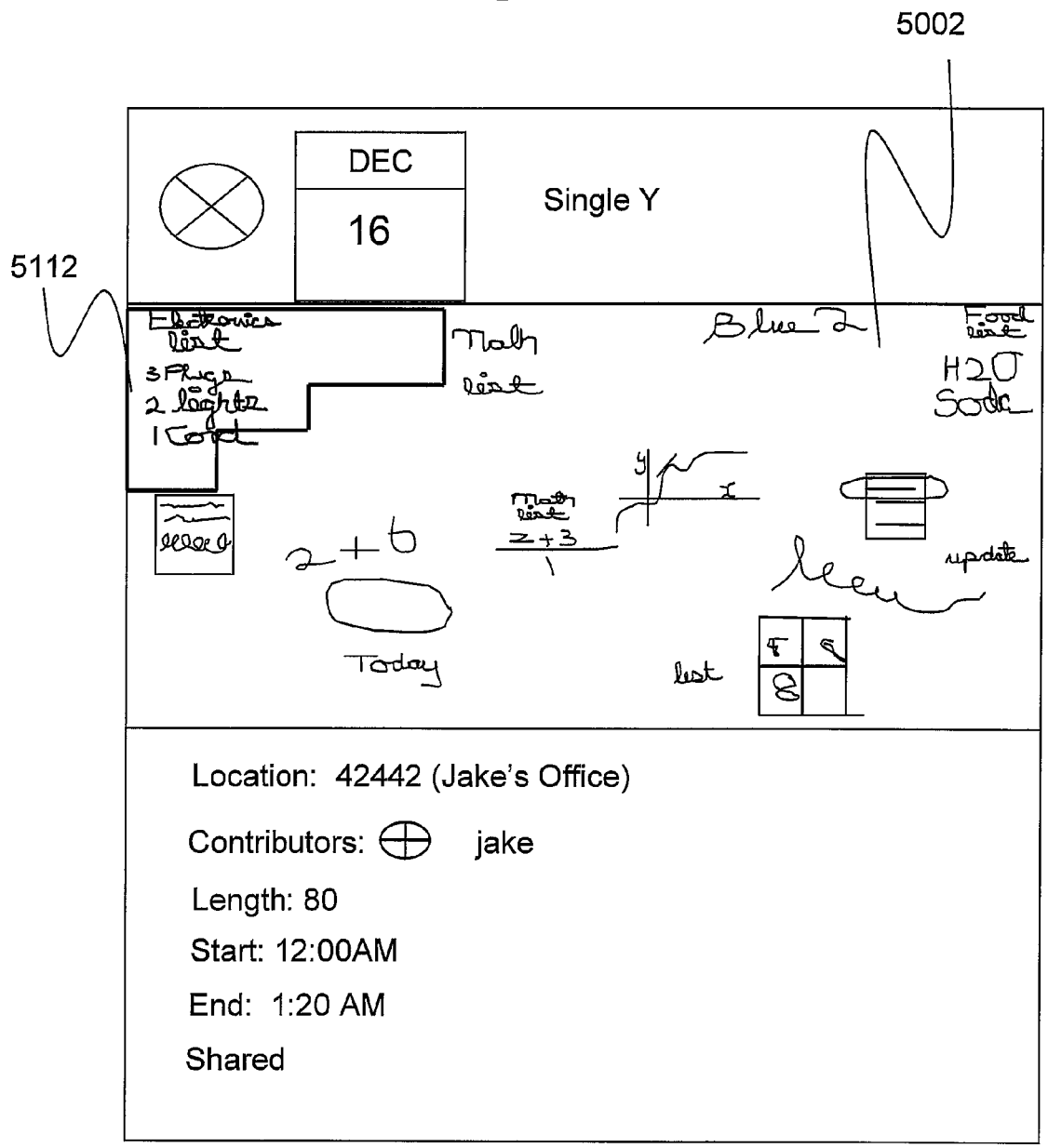
Figure 5D:
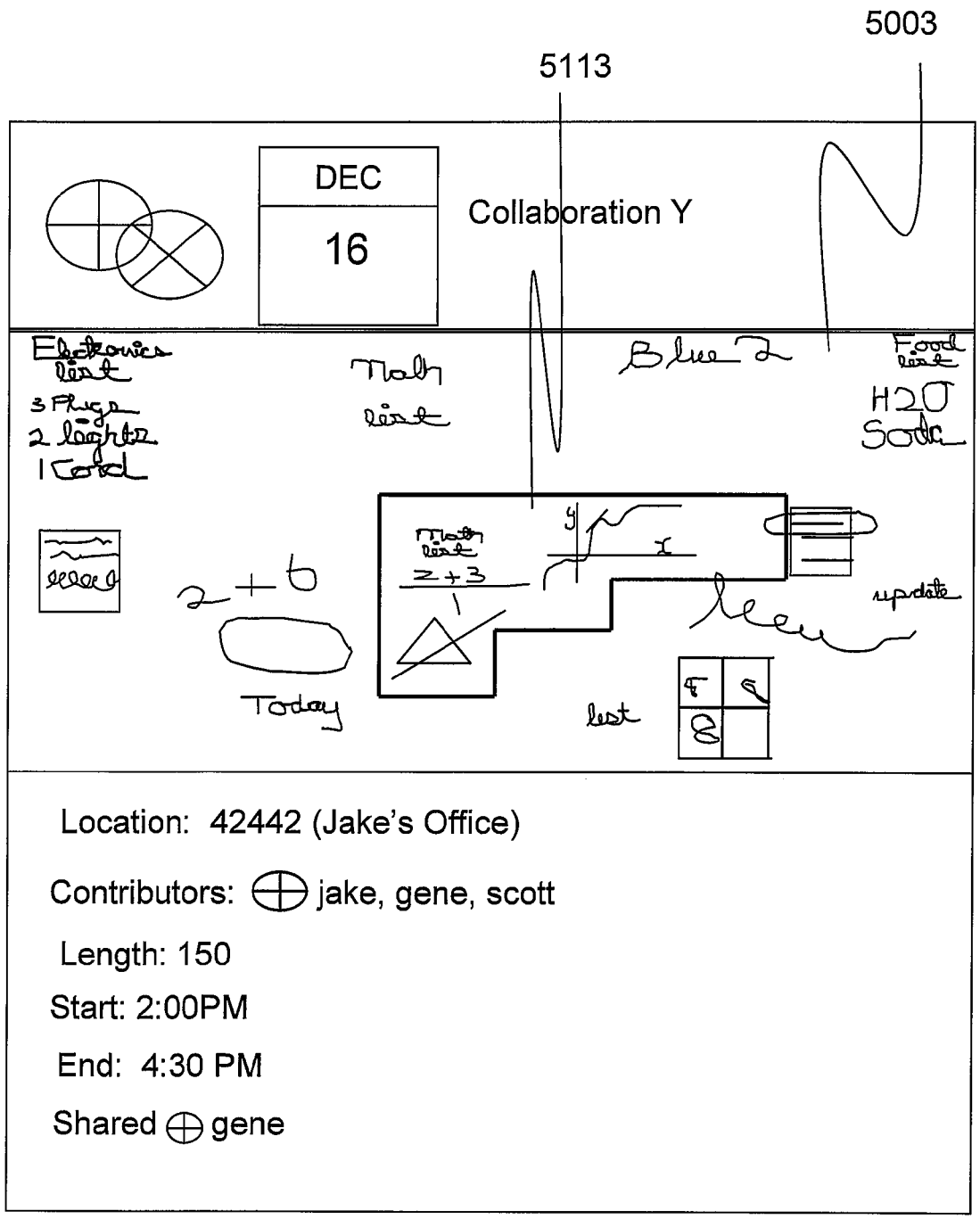

FIG. 5A shows images of a whiteboard as seen on a computer screen located in the office of a first person 5100. FIG. 5B, FIG. 5C and FIG. 5D corresponds to insets within FIG. 5A that include details of what is shown on the computer screen. In this exemplary aspect, both the whiteboard and the computer are in the same office that belongs to the first person called Jake. The computer screen includes three images 5001, 5002, and 5003 of the whiteboard. FIG. 5A additionally shows a calendar 5010 appearing on the computer screen that identifies the content modification events. A camera, that is not shown, may also be present in the office to capture the images off the board either as a function of time or responsive to a sensed activity near the board.

In addition to the first person 5100, who is referred to as Jake, a second person, referred to as Gene, and a third person, referred to as Scott, have also had access to the whiteboard and may have modified its content during a content modification event. Therefore, the content modification event may be a personal event during which one person alone is present at the board and adds content to the board or otherwise modifies the content of the board. The content modification event may be a collaborative event during which two or more people are present at the board and one or more of those present may add to or otherwise modify the content on the board.

Two single-user events and two collaborative events are shown on the calendar corresponding to December 15 and December 16. A first single-user event occurs on December 15 and a second singer user event occurs on December 16. The two collaborative events occur on December 16. These events appear on the screen according to the timeline of their occurrence with the earlier events appearing to the left of the screen and the more recent events occurring to the right.

The view corresponding to December 15, and shown in FIG. 5B, shows a single-user event during which Gene was present at Jake's office and modified the content on the board that is located in Jake's office. The modified content is highlighted on the board as 5111. While the board is located in Jake's office, because the event is registered as a single-user event, Jake himself was not sensed as being present during the creation of the modified content 5111. Neither Jake nor Scott were sensed as being present during the single-user event 5011. Yet, the modified content 5111 is available for viewing by Jake because the board is in Jake's office; it is available for viewing by Gene, because it was created or modified by Gene, and additionally it is available for viewing by Scott because either Jake or Gene decided to override the system and to share the content with Scott.

View 5012, enlarged and presented in FIG. 5C, shows another single-user event during which Jake modified the content on the board located in his own office. The modified content is highlighted on the board as 5112. Because the event is registered as a single-user event and no one other than Jake himself was sensed as being present during the creation of the modified content 5112, the modified content 5112 is considered personal to Jake and is available for viewing by Jake alone. Neither Gene nor Scott were sensed as being present during the single-user event 5012. If Jake decides to share his personal content 5112, he can override the system and send the content for viewing to other users.

View 5013, enlarged and presented in FIG. 5D, shows a collaborative event during which Jake and Gene were sensed to be present at the board in Jake's office. Either or both of them may have modified the content on the board which is highlighted as 5113. The system does not register which user modified the content; only which users were present. The modified content 5113 is considered to be a shared content between Jake and Gene and is available for viewing by Jake or Gene at their respective computers. Scott was not sensed as being present during the collaborative event 5013. Therefore, Scott does not receive the content. Either Jake or Gene may decide to share their collaborative content 5113 with Scott. In that case, either collaborator can override the system and send the content for viewing to other users including Scott.

The above provides one example of how the system may operate. Many variations equivalent to the above description are possible and fall within the boundaries of the invention.

The system can provide interfaces to allow users to view collaboration sessions detected for their camera, as well as to support sharing. FIG. 5A, together with its insets, FIG. 5B, FIG. 5C and FIG. 5D, show visualizations of shared captures over time. In the views shown in FIG. 5A, single-user sessions 5011 and 5012 appear alongside automatically detected collaboration session 5013. In these views, "Collaboration Y" was a collaboration in "Jakes' Office" between users "Gene" and "Jake," who is the camera owner. In one aspect of the present invention, the entries made during collaboration sessions are editable and shareable. This interface also supports sharing captured collaboration sessions with other users, as well as threaded discussions. Related e-mails are one example of threaded discussions. E-mails are grouped together so that a user can follow the history of the conversation. Threaded discussions are often used to organize comments around artifacts. In addition e-mail, picture web sites and blogs are two more examples that often include threaded discussion lists.

Some aspects of the present invention, that are described below, allow portions of the board that have been subject to change due to erasure, addition or modification to be identified and presented to the user. These aspects of the present invention, permit a user that has an episodic memory of the region of the board that he has modified, to retrieve his modifications, by providing the approximate location of the modified content to the system. If the user has a memory of the approximate time range during which he suspects he modified the content, both the approximate location and the approximate time range are provided to system to retrieve the desired content.

People write on whiteboards to express, understand, communicate, and remember ideas. Over time, the information on the whiteboards gets erased and re-written. Leaving information on the whiteboard, is not the best option because it reduces the amount of available space, and therefore the usefulness of the board for ongoing activity. One way to mitigate the limitations of whiteboard space is to capture whiteboard images digitally and preserve and archive all of the captured images. Whiteboards can thus be erased and the space on them re-used, without loss of earlier information. However, an archive of all of the captured images may become massive and difficult to use over time. Therefore, organization of such data and its presentation such that the desired portion of the data is easily identifiable and retrievable presents a challenge.

Data in the archive can be organized based on content analysis or metadata associated with each image. For example, images may be grouped by the regions that changed over a given time interval, by the colors used in the writing, or by time of creation and location that are associated with the image as metadata. The effectiveness of such an image archive relies on easy-to-use tools for retrieving information from the archive. Aspects of the present invention describe several methods and means of organizing images of captured whiteboards for the purposes of making particular captured images easier to retrieve. Various interactive methods may be used for retrieving one or more desirable images from a database having many images stored. Various visualization methods may be used to show the frequency of change in each region of the board. Two exemplary visualization and interaction methods of using a heatmap and using a timeline are described.

A heatmap is a continuous two-dimensional visualization in which values of a single variable are mapped to different colors. If the single variable that is being visualized, is the frequency of change in content, then a red area on the map may signify frequent change and a blue area on the map may indicate infrequent change. A white area on the heatmap, for example, may indicate no change in the content in that area.

FIG. 6 shows a flowchart of an exemplary method of generating a frequency map of content modification on a whiteboard, according to aspects of the present invention.

The method begins at 6000. At 6001, images of the board that are captured over a slice of time are received at a database. At 6002, the images are stored in the database. At 6003, each image is segmented into a plurality of sub-images. At 6004, each image is compared with a preceding image to determine whether any of the sub-images has changed from one image to the other image. At 6005, a score is determined for each of the sub-regions as a number of times the corresponding sub-image has changed. At 6006, the scores were visualized by mapping the scores to a frequency map. At 6007, the frequency map is displayed to the user. At 6008, the method ends.

A two-pass method may be used. In the two-pass method, before segmenting each image into a plurality of sub-images, each overall image is compared with a preceding image to detect whether the overall image of the board has changed before the images are segmented and compared. In other words, when the method uses a two-pass system, a rough and computationally inexpensive pass is followed by a detailed and computationally exhaustive pass only if the second pass is necessary. If there is no change from one board image to the next, the images are not segmented to determine the frequency map.

Figure 7:
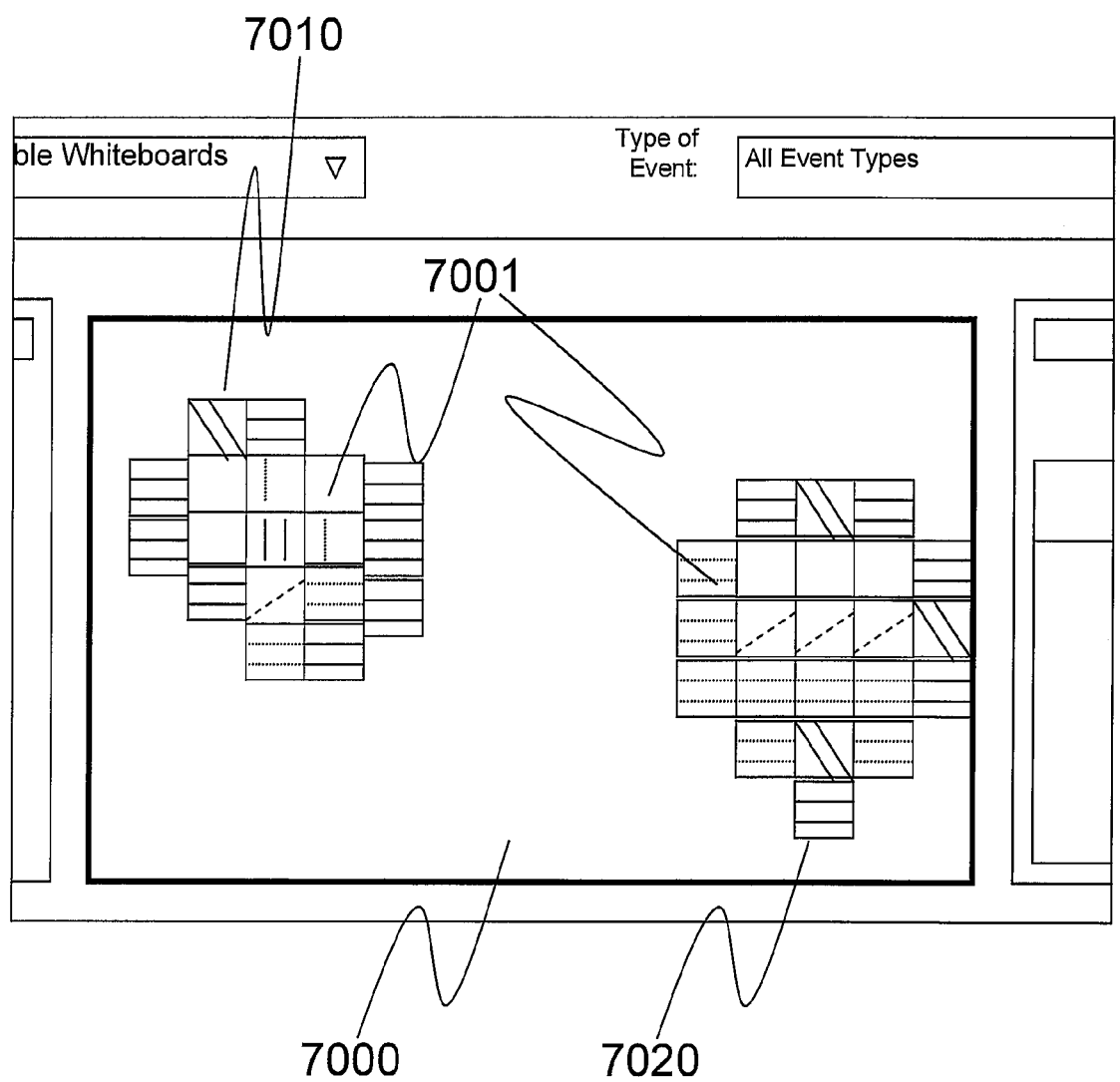
FIG. 7 shows an exemplary two-dimensional frequency map, or heatmap, for visualizing frequency of change in regions subject to modification on a whiteboard, according to aspects of the present invention.

The user may select a portion of the map according to his memory of either the approximate location on the board where he remembers the content to have been placed, or the approximate time during which the change was made to the board content, or a combination of both location and time. The frequency map may be a two-dimensional histogram, or a heatmap, as shown in FIG. 7. When a two-dimensional heatmap is superimposed on a representation of the board and presented to the user, the user may select an area of the map that corresponds to change and he remember as having had modified. Then, the system would provide the user with individual images of that location for user's inspection. Alternatively, the frequency map may be a one-dimensional histogram or a time-line as shown in FIG. 8. A one-dimensional frequency map is used when the user has a memory of the approximate time of the change. This memory combined and confirmed by the data regarding change that is provided by the frequency map permits the user to pin-point an interval in time. The system then provides the images corresponding to the selected time interval for user inspection.

At 6001, images of the board that are received at the database, may be captured at regular time intervals over a slice of time lasting from a time one to a time two. For example, daily images may be taken from the board over the month of January. If the images are captured at regular time intervals, such as daily, then any aggregation of the days may be used as the basis of frequency. Irregular intervals may also be used, for example one image may be captured at the end of a day and next image at the end of the week. This just impacts the time basis of the frequency that is determined. As another example, the images may be captured based on activity. The camera system may check the board contents regularly and capture an image only when it detects activity at the board or save the image only when it detects a change in the content.

At 6003, an image is segmented into some number of sub-images. In one example, the image may be divided into a number of sub-images, depending on the size and aspect ratio of the board. At this stage, the number of sub-images that are used determines the resolution with which change is determined. For example, the images may each be divided into 200 smaller squares by dividing a long side of the board into 20 intervals and a short side into 10 intervals (20×10=200). This creates a division similar to pixels of an image; however, pixels belong to an image while the sub-images pertain to particular regions or sub-regions of to the board. Then, each square of one image is compared to corresponding square of the previous image to detect if the writings and drawings on the board in that particular square have been changed between the two images. Alternatively or even at the same time, each image may be divided into 100 larger squares (10×10) and the same comparison may be carried out between the successive images over the larger squares. Both methods yield the change from one image to the next. However, the size of the sub-regions identifying the particular location of the change would be different between the two examples. Division of the board into square regions or sub-regions, or the division of images into square sub-images is exemplary. Any irregular division that covers the entire board may be used as long as all the images are analyzed subject to the same division.

At 6004, each image is compared to its previous image to determine the areas that have changed. At this stage, each sub-image is compared to the corresponding previous sub-image, both pertaining to the same sub-region, to determine if the sub-image has changed. In effect, the image of each region or sub-region is compared to the previous image of the same region or sub-region to determine whether the region or sub-region was changed by being erased, written to, or rewritten. The determination of the change may be based on a threshold value or a binary determination of any change versus no change. In one example, any region that corresponds to a sufficiently large change in content is recorded in a database, along with one or more pieces of metadata such as the identification of the corresponding camera, an identification for the image and the time of capture. A sufficiently large change that triggers the recording may be a predetermined value input by the user or may be decided automatically based on the overall degree of change in the images. In another example, change can be represented as a binary value showing change versus no change. Change may be represented as a numerical degree of change and the degree of change may be normalized to the [0,1] range. The degree of change may be calculated at multiple scales, dividing the captured image into progressively smaller sub-images. The same calculation is performed at each scale. At retrieval time, the user can specify the scale at which analysis was performed. The nature of the change may be recorded in the database as well. The nature of change may be addition, erasure, or replacement.

In one aspect of the present invention, an image and its sub-images consist of pixels. When two images or sub-images are compared, change in the pixels from one image to the next is detected. The change may be detected by comparing a Fourier transform of one image or sub-image to a Fourier transform of a subsequent image or sub-image. The change may be detected by comparing any other appropriate transformation or function of one image or sub-image to the next. Any other appropriate measure of change may be used.

At 6005, a score is determined for each sub-image. The score of a sub-image is effectively a score for the sub-region represented by the sub-image. The score of each sub-image may be set to the number of changes occurring in the region or sub-region corresponding to the sub-image over the slice of time or a subset of this slice. For example, the score of a sub-image may be the number of times that the region or sub-region of the board, that is subject of the sub-image, was modified during the month of January. This score has two types of division, or resolution, associated with it. The number of time divisions or space divisions determines the size of the resulting time intervals or the resulting sub-regions which is referred to as the resolution of the map. The time resolution is daily because the images were taken from the board on a daily basis. The space resolution depends on the size of the sub-images over which the comparison is carried out. The time resolution is not arbitrary once the images are captured. Therefore, the sized of the time divisions, or the time resolution, is decided at the time that a schedule for imaging the board is being set. The size of the sub-images is decided at the time of analyzing the images and the scores may be determined for several different and arbitrary sub-image sizes. In the above example, if the images are captured on a daily basis, then the score of each sub-image, is the number of days that the region or sub-region of the sub-image was changed during the month of January. The duration of the slice of time used to determine the score may be changed at the time of analysis. For example, the score may correspond to the number of changes occurring during the second week of January.

The score may reflect a binary value of any change versus no change in the region or sub-region such that the score of a sub-image, or sub-region corresponding to the sub-image, reflects how many time the sub-image/sub-region was changed during a certain period of time. In this binary scenario, the score would be a sum of ones and zeros. Alternatively, the score may reflect a non-binary change value such that various degrees of change are reflected with different numbers varying, for example, between 0 and 1. The score may be determined as a function of a degree of change in a region or sub-region from one sub-image to a consecutive sub-image. The score may be determined as a function of the number or a percentage of the pixels that change from one sub-image to a consecutive sub-image for the same region or sub-region.

At 6006, the generated scores are visualized. For example, a heatmap is generated by mapping the scores of the regions or sub-regions to a two-dimensional plot that is representative of the board. Once the data has been collected, it can be visualized by selecting a set of images based on a selected time interval or time range, and then identifying the regions or sub-regions that change during that time interval. A score is calculated for each region or sub-region by accumulating contributions from each image in the selected time range. Scores corresponding to the change in each region or sub-region can be computed by summing the degree of change for that region or sub-region. However, in order to magnify or subdue the difference, the sum may be subjected to non-linear transformations such as a logarithmic transformation or a step-wise linear transformation. If the score for a region is orders of magnitude larger than the score for a neighboring region, then a logarithmic transformation may be used to bring the indicators of the scores closer together. If the scores are too close for visualization, a different type of transformation may be used to magnify the difference between the scores.

At 6007, the generated frequency map is displayed to a user, for example on the computer screen of the user. The user may interact with the frequency map at this point. He may change the resolution of the frequency map by changing the size of the sub-regions. He may change the duration of the slice of the time that determines the frequency of change.

In one exemplary scenario, given a set of images, each image is segmented into sub-images corresponding to sub-regions, pair-wise differences between corresponding sub-regions in consecutive images are computed, and the number of times a particular sub-region has changed in the selected set of images is determined. This implies that the measurement of change is binary: either the region has changed, or it has not. However, it is possible to implement discrete or continuous change metrics as well, for example, counting the number of changed pixels within a region and normalizing by region size when region size is given in pixels. This method would provide a proportion of change. Then, to obtain the score, either the proportional changes are accrued, or subjected to some type of a threshold in to produce a binary outcome.

FIG. 7 shows an exemplary two-dimensional frequency map, or heatmap, for visualizing frequency of change in regions subject to modification on a whiteboard, according to aspects of the present invention.

The visualization of change may be achieved by a heatmap. FIG. 7 shows an exemplary heatmap showing frequency of change of a whiteboard content. An image 7000 of the entire board is divided into square sub-images 7001. The images of the board for each square sub-region corresponding to the sub-image 7001 are compared between one point in time to a previous point in time. Two areas 7010 and 7020 are detected as a result of this comparison. The areas 7010 and 7020 are active regions and correspond to regions where the frequency of change exceeded a threshold. In other words, the whiteboard was modified frequently in areas 7010 and 7020 by writing and erasing and re-writing material on the board in these areas. The regions along the margins of the board were modified infrequently and therefore, the heatmap does not show them as regions of active change.

In a heatmap, the scores representing frequency of change are mapped to hue, brightness, or saturation distributions. For example, regions with a high frequency of change can be colored red, while those with low or no change can be colored blue. The frequency of change may be reflected in a score for each region. The mapping between the region scores and visual attributes used to represent them can be normalized based on an absolute scale, or on the range of values present in a particular sample. It can also take into consideration the duration of the time slice used to select images. Frequency is defined as number of changes per unit time. The unit time that forms the basis of frequency calculation, in this case may be the total slice of time that is used to collect the images and any subset of this slice down to the time interval between two successive images.

A user can interact with a heatmap to navigate to the desired set of images by clicking on a region, by dragging out a selected rectangle or area, or through any other spatial selection technique. More than one cluster can be selected through multiple selection techniques, or by applying a threshold to the distribution of region scores. Once a set of images has been identified, more details can be displayed for each contributing image. Selecting one of these images from the resulting list or menu display can provide the user with the complete image and its metadata.

In the context of the present invention, and as seen in FIG. 7, a frequency map may be used to show the extent to which regions of a whiteboard image change over time. As each image is captured, its content is compared with the previous image to identify whether there is any change from one image to another and if there is a change to identify which regions in the new image have changed because something was added or removed. Data are accumulated over a user-specified time interval. The more change a particular region experiences, the more emphasis it would receive in a two-dimensional representation. Such a frequency map could be used to identify relatively static or relatively often-changing regions on the board. The user could then examine the images that pertain to regions that had changed, rather than having to look through all of the images of all regions. Further, if several frequency maps for different time intervals are obtained, only some of the frequency maps pertaining to some of the time intervals may indicate change. In that case, only images pertaining to those particular time intervals may be examined. In this manner, the search may be circumscribed by both time and region.

Then, in order to find the content pertaining to a particular modification, the user will have to visually inspect the images pertaining only to those regions that showed activity within the particular time interval.

FIG. 8 shows exemplary one-dimensional frequency maps, or timelines, depicting frequency of change of content on a whiteboard, according to aspects of the present invention.

One way to visualize the change in collected images in order to facilitate the search of a particular image is by organizing the data according to space and, for example, generating the two-dimensional heatmap of FIG. 7. Another way to visualize the change in the collected images is by organizing the image data according to time and generating the timelines shown in FIG. 8. The timelines shown in FIG. 8 are examples of periodic timelines. Some events take place on certain days of the week and, for example, all images captured during Tuesday design meetings may be additionally identified as such. A timeline can be constructed to group images, for example, based on the changes by the day of the week during which the change was made. Timeline visualizations can be created by grouping the selected set of images based on some recurring feature such as the day of the week, and computing scores for each such feature. The score can then be mapped onto the height of a bar to produce a one-dimensional histogram display. Scores can be transformed with a nonlinear function to facilitate the visual discrimination of the data.

In each visualization, data can be filtered further by such additional attributes as the nature of the change which includes erasure, addition or replacement.

Timelines 8010 and 8020 show one-dimensional frequency maps of the changes in the content of the whiteboard. The first timeline 8010 groups the frequency of change according to the day of the week. The data shown on timeline 8010 may pertain to one single week or to a number of weeks over a continuous period of time or over particular discontinuous periods. For example, the timeline 8010 may pertain to the first week of January 2009. Alternatively, the timeline 8010 may show an aggregation of data from all of the weeks in the year 2009. As yet another alternative, the timeline 8010 may pertain to certain weeks in June and certain other weeks in October of 2009. According to the timeline 8010, there was a large degree of activity, involving the change of content of the board, on Monday or Mondays of the period plotted along timeline 8010. In contrast, there was no activity on the Sunday or Sundays of the plot period.

Timeline 8020 shows the pattern of activity, involving and including a change in the board content, plotted according to the time of the day. This plot, again, may pertain to a single day or may pertain to a number of days over either a continuous or a discontinuous period of time. The timeline 8020, for example, may show the activity on a whiteboard in the kitchen of a research facility. Activity is large at 8 when the employees get their coffee and may write reminders, advertisements or announcements on the whiteboard in the kitchen. Change in the board content is also large at noon.

The one-dimensional frequency maps shown by the timelines 8010, 8020 may pertain to all of the board or certain portions and regions of the board. For example, a timeline may show the scores indicating frequency of change for the sub-images corresponding to one sub-region at each time interval over a duration of time. Alternatively, the scores of several sub-regions forming a region of the board may be combined to obtain a combined score pertaining to the region. This combined score is then plotted on a timeline. In yet another alternative, the frequency scores pertaining to each region may be obtained directed by examining the number of changes in content for that region.

FIG. 9 shows a flowchart of an exemplary method of retrieving images from the image database using the frequency of change, according to aspects of the present invention.

The method begins at 9000. At 9001, a selection of a first time interval is received from a user at a system implementing the method. For example, the user is looking for a particular content that he drew on the board and has since been erased. The user, however, remembers the approximate time when he had worked on the content and enters the first time interval to encompass the time he remembers. At 9002, a selection of a first region of the board is received from the user. For example, the user remembers where on the board he was writing and drawing when created the content that he is now looking for. At 9003, the user supplies a selected number of sub-regions to the system. For example, the user is more likely to remember whether he changed one small formula in a small area or he redrew an entire diagram encompassing a large area. At 9004, the system, used for implementing the method, displays a visualization of frequency of change to user that may be presented in the form of a two-dimensional frequency map, or a heatmap. The visualization pertains to the frequency of change over the first region and for the first time interval. At 9005, the system receives a selection of a second region of the board from user. The second region may be a frequently modified portion of the first region according to the visualization provided to the user. The user first selects the approximate location on the board where he made his marking at 9002 and then at 9005 with the aid of the heatmap, the user is able to provide a more focused selection to the system. At 9006, the system receives a selection of several second time intervals from the user. One aspect of the method utilizes the studies that show episodic memory based on space is generally superior to memory based on time. Therefore, the user is first permitted to specify an approximate location on the board. Then within the selected location, the user may further refine his selection of time. At 9007, the system displays a frequency map to user over the second region and for each of the second time intervals. So, several frequency maps are shown to the user at this stage. At 9008, the system receives a selection for one of the second time intervals from the user. The user has viewed the several frequency maps and can locate the time interval during which the modification of board content occurred. At 9009, the images of the board captured from the second region of the board and during the selected one of the second time intervals are displayed to the user. The user can look at and examine each image individually. The image may be the image of the entire board or the second region. At 9010, the method ends. By using the method of this flowchart, the user has circumscribed the desired image by time and by location on the board. As a result, he can look through fewer images of the board in order to find the particular notes that he made on the board that might have been since erased.

The writings and drawings on a whiteboard are generally temporary. The whiteboard may be imaged using a web or hand-held still camera over a period of time such that sequential whiteboard photographs are captured. The photographic images may be uploaded into a folder on a desktop operating system. Using the standard file folder views in the operating system, the user can sort the individual images based on the time that they were taken. Thumbnail representations in these views provide a summary of the data contained in the image. Finally, using existing imaging viewing or processing software, a particular image can be opened for detailed inspection. Further, web-based applications may be used that enable a user to retrieve and browse the captured whiteboard images when the user specifies a specific span of time or a location of the whiteboard. Aspects of the present invention provide a visualization and interaction interface for seeing the aggregation of changes between successive images.

Automatic capture of whiteboard content, in whole and in part, may be actuated by placing markers directly on the whiteboard surface. Aspects of the present invention collect all whiteboard content as opposed to collecting only that content which is explicitly identified by the users.

Aspects of the present invention describe a method and a system that visualizes change over time of a whiteboard in order to provide non-sequential access to the images that appeared on the board and may have been since erased. Visualizations may be generated by grouping images based on content and metadata, and by treating images as consisting of components, rather than as monolithic objects. The decomposition of captured images allows grouping of the images using standard similarity metrics. The visualizations are used to provide non-sequential access into a large collection of images collected from a whiteboard for the purposes of re-visiting or re-using previously-captured images.

The above-described features preserve substantially all board content and access is provided when the user is seeking to find particular images and knows the approximate time the content was generated and the approximate region on the board where this content was generated. The content that the user is searching for is generally of the type that is frequently modified or erased. Some other the aspects of the present invention, that are described below, address methods and systems for dealing with persistent writings on a board such that board space is freed up while the contents of the persistent writings have also been preserved. Persistent writings generally pertain to notes that the user wished to have available or visible over a long period of time. Therefore, the archival and search features of the above aspects of the present invention, are not particularly well-suited for some types of persistent writings.

FIG. 10A, FIG. 10B, FIG. 10C and FIG. 10D show an exemplary schematic depiction of extracting reminders from images of whiteboards and displaying the images as overlays on a personal device, according to aspects of the present invention.

In one aspect of the present invention, the persistent reminders on a whiteboard are identified within an image captured from the whiteboard, the persistent reminders are then shown on a screen of a personal computer or other personal electronic device of the owner of the whiteboard. For example, the reminders may be transferred to a mobile user device. As a result, the whiteboard space is freed up for other use while the reminders persist on the computer screen of the user. Alternatively, the reminders may be stored on a storage space and available for redisplay. Reminders from different times and, even from different boards, may be combined together into one display on the screen. The reminders that are to be displayed on the screen may be selected automatically, manually or through a mixed semi-automatic initiative.

Figure 10A:
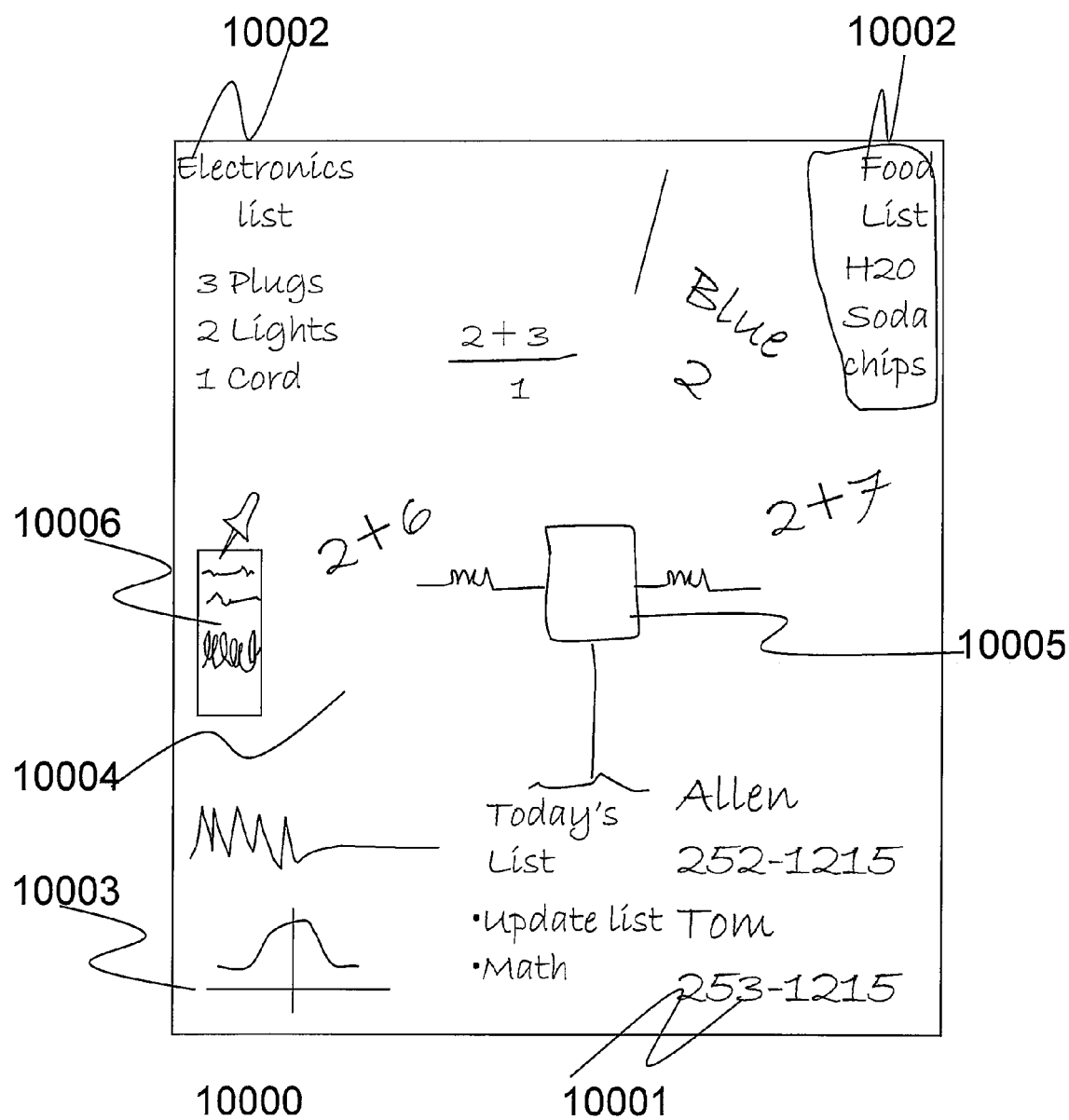

FIG. 10A shows an image of a whiteboard 10000 from which reminders were drawn. The whiteboard 10000 includes a number of writings and drawings as well as posted notes and pinned notes. The contents of the whiteboard 10000 may, for example, include a list of telephone numbers 10001, a to-do list for the owner of the whiteboard 10002, one or more diagrams of statistical distribution functions 10003, several equations 10004, and notes pertaining to the discussion of a circuit diagram 10005. A note 10006 is also pinned to the board.

Figure 10B:
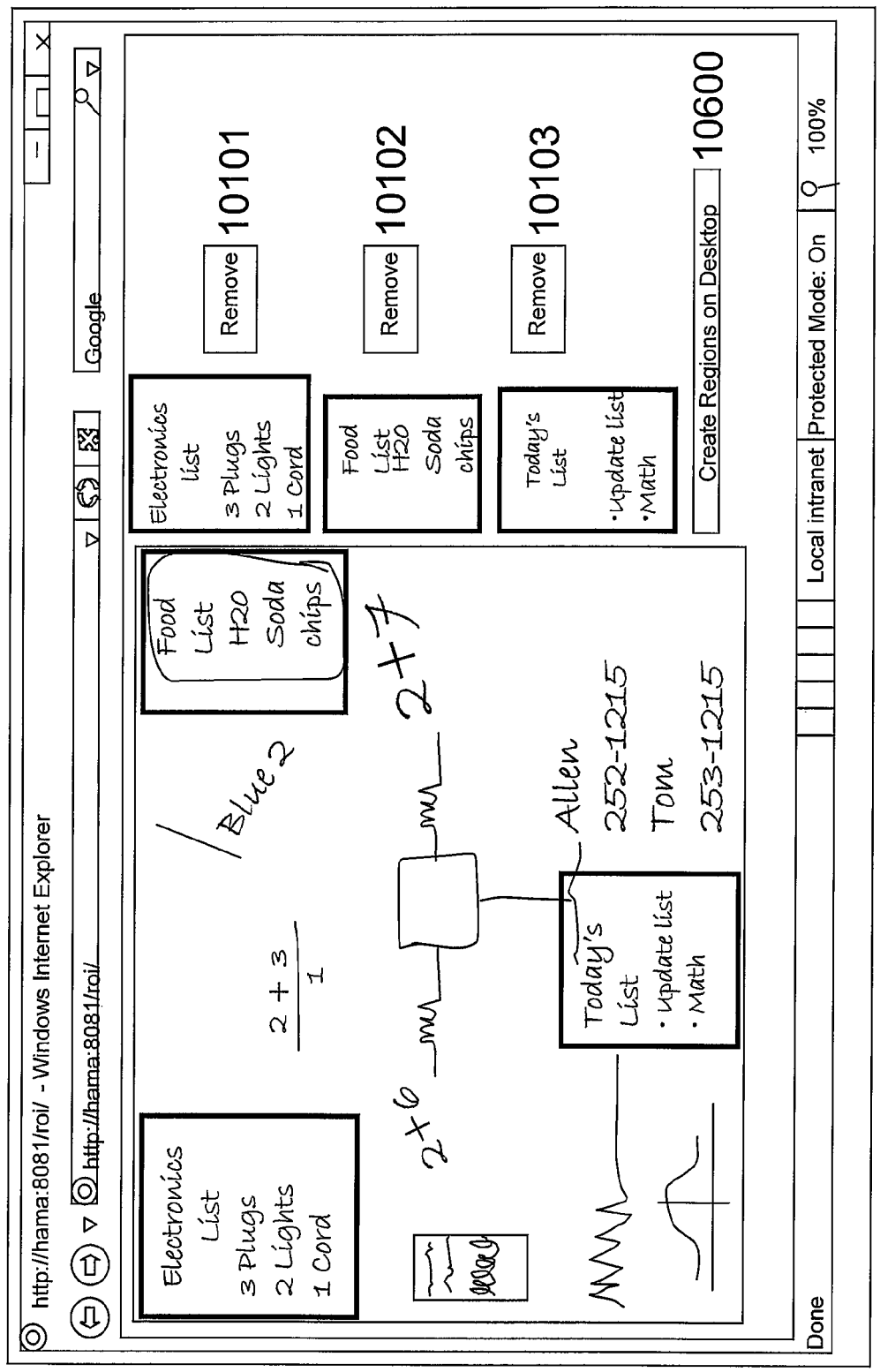

FIG. 10B shows a user interface on a user's personal computer or other electronic device for selecting whiteboard regions to become desktop reminders. FIG. 10B shows an image 10100 of the same whiteboard 10000 as shown on a user interface 10500. The user interface 10500 permits a user to select some regions of the whiteboard to become desktop reminders. In the exemplary user interface 10500 shown in FIG. 10B, a mouse may be used to draw rectangles circumscribing the selected regions 10101, 10102 and 10103. Images of the selected regions 10101, 10102, 10103 are subsequently extracted and shown on the user interface alongside the image of the board 10100. The rectangular selections using a mouse are exemplary. Any other means of communicating a selected region to the user interface may be used instead. FIG. 10B also shows an area 10600 on the user interface that is adapted for receiving a command for creating regions on the desktop for receiving the selections. Once captured in an image, the reminders can be left on the whiteboard, or erased. The user will be able to retain the reminder aspects while freeing up the whiteboard for other uses.

FIG. 10C shows a desktop view showing two of the reminders and other content. In FIG. 10C two of the selected reminders 10101 and 10102 are displayed on the screen 10500 of the desktop computer belonging to the user. In this exemplary view, the reminder 10101 in the left corner is shown at 100% opacity because the user has selected it while the reminder 10102 on the top right is shown at a default of 50% opacity.

Figure 10D:
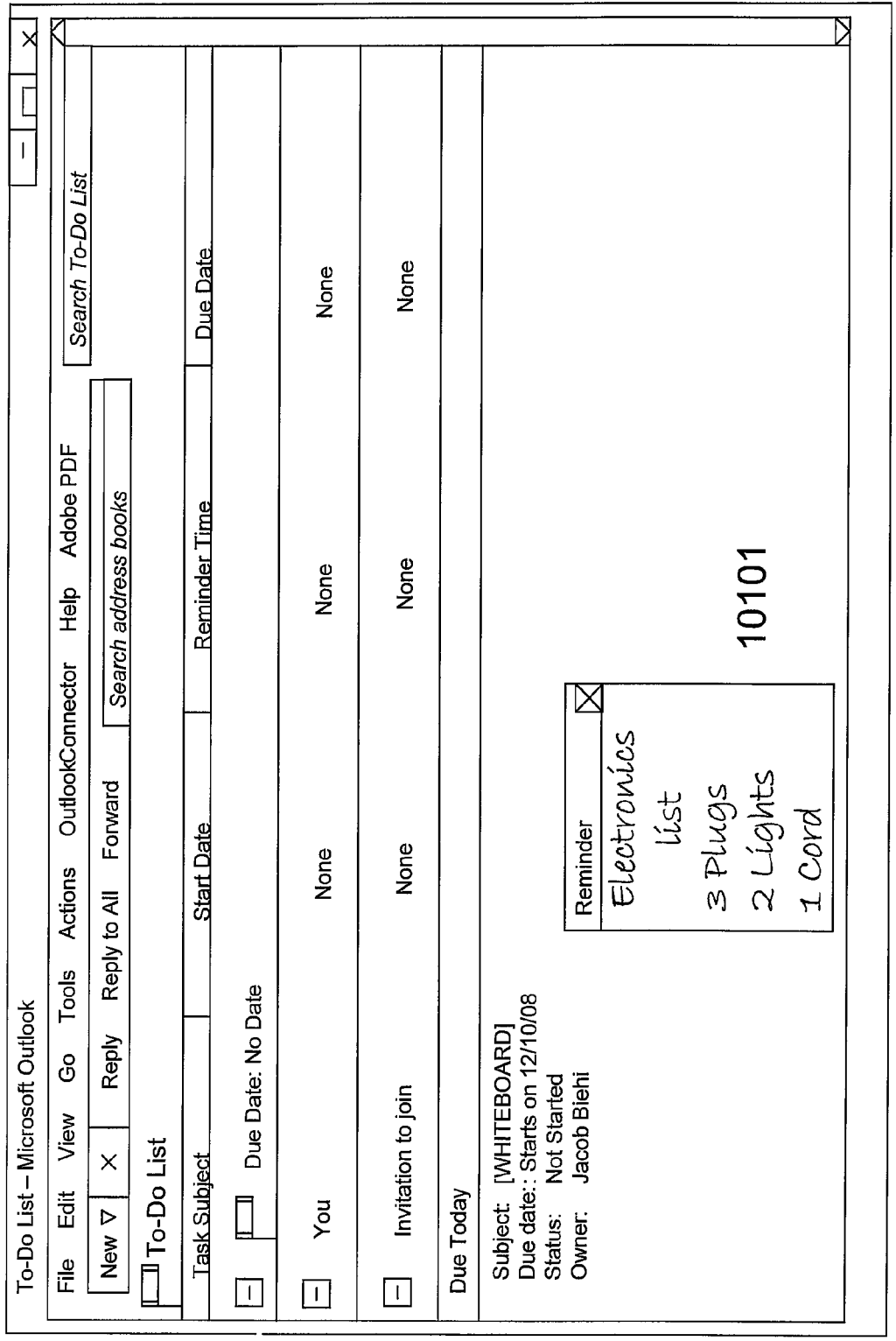

FIG. 10D shows a personal information management view where the reminders appear. The selected reminder 10101 is shown as appearing in the tasks view of the user's desktop calendar or other personal information management software.

Figure 11A:
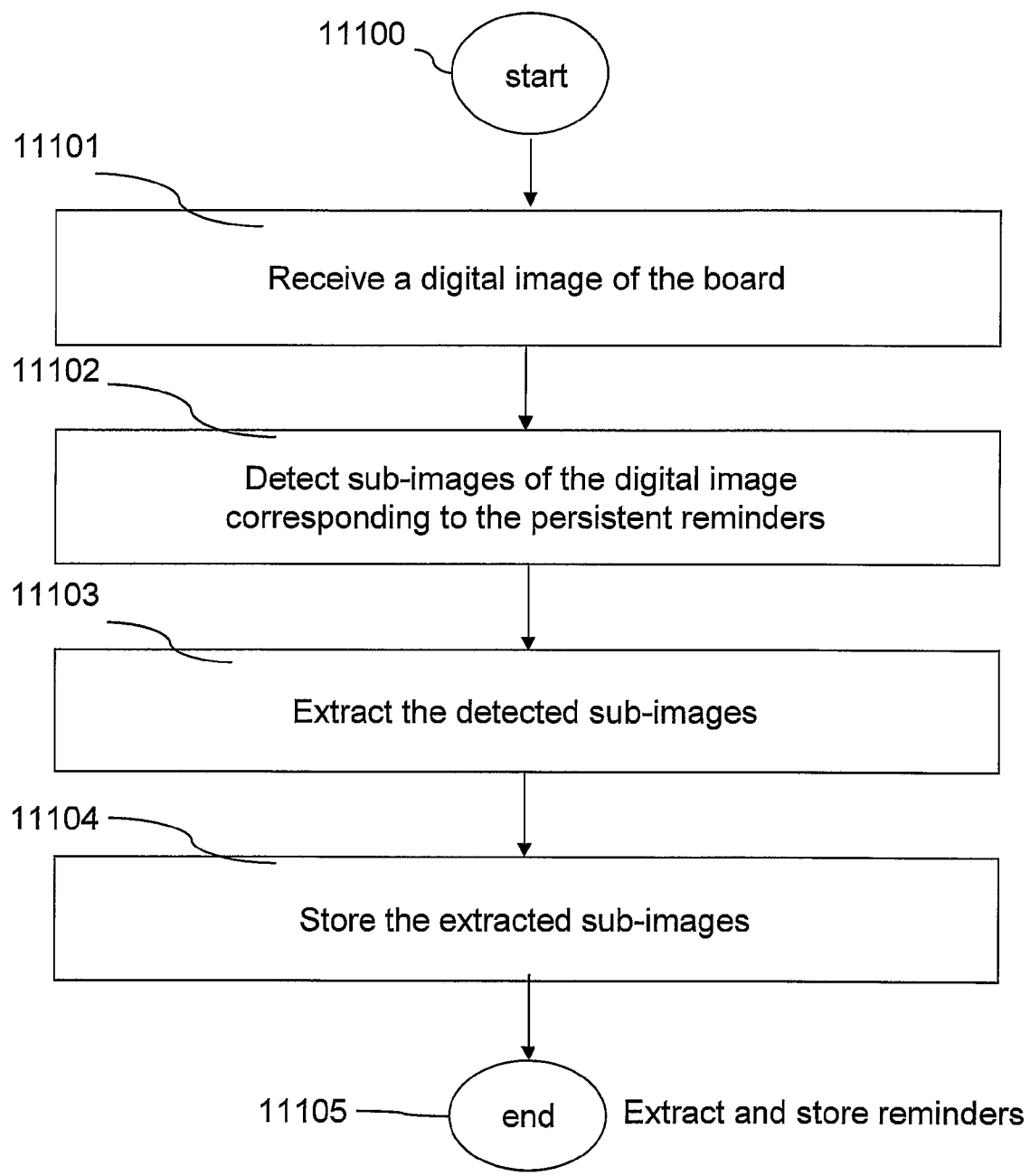

FIG. 11A shows a flowchart of an exemplary method of extracting reminders from images of whiteboards and storing them in a database for later processing and access, according to aspects of the present invention.

The method begins at 11100. At 11101, a image of the board is received. At 11102, sub-images of the image that correspond to the persistent reminders are detected. At 11103, the detected sub-images are extracted. At 11104, the extracted sub-images are stored in a database. At 11105, the method ends.

FIG. 11B shows a flowchart of an exemplary method of extracting reminders from images of whiteboards and displaying the reminders as overlays on an electronic display of the user, according to aspects of the present invention.

The method begins at 11000. At 11001, an image of a whiteboard is captured using a digital camera. In one example, the whiteboard belongs to the user because only the owner of the whiteboard is generally interested in the reminders that may be personal to him. At 11002, the regions of the image that are to be saved are detected or identified. The detection of the regions may be done automatically by the machine. Alternatively the user interface of the electronic device provides the user with the ability to identify and choose arbitrary regions of the whiteboard image for saving. The detected or identified regions may correspond to any part of the whiteboard having any type of information. The regions identified by the user, or automatically detected by the machine, may correspond to reminder regions having a list of telephone numbers or to-do lists that remain incomplete and persist on the whiteboard thus taking up space. At 11003, metadata associated with image and metadata associated with each detected region are collected. The detected regions correspond to sub-images of the image. At 11004, a record is created for each detected region. The record includes the sub-image of the region and its associated meta-data. The records are saved on an electronic storage medium. At 11005, the user interface provides a preview of the identified regions to the user. At this stage, the user is given the choice to enter his selection manually. At 11006, the user interface receives a selection of one or more of the identified regions for being displayed on the desktop screen or being transferred to the electronic calendar of the user. At 11007, the selected regions are retrieved from the storage medium and displayed on the user interface or on another screen belonging to the device of user's choice. The saved regions may be displayed within the software medium of the user's choice as well, for example, merely on the desktop of the user's personal computer or within the calendar program of user's choice. Various visual effects may then be implemented that denote the importance of the saved and displayed region or the approaching due date of a reminder that is the subject of the saved region. At 11008, the user manipulates the images shown on the display to conform them to him preferences. At 11009, the reminders are printed either automatically or at discretion of the user. At 11010, the method ends.

As explained above, the displayed regions of the whiteboard may include any type of content. Reminder notes persist on the whiteboard and take up useful space. Therefore, it is desirable to remove these reminders. On the other hand, the reminders persist because the user needs to refer to them over an extended period of time and does not wish to lose the content of the reminders. Therefore, the whiteboard notes serving as reminders are one typical type of region that would be the saved and redisplayed by this aspect of the present invention.

The detection (11002) of the candidate content regions for saving may be manual, automatic, or semi-automatic.

Using the manual method, a user would bring up a whiteboard image captured from a particular camera, select a region for saving, and cause the system to record that image. Thus, in the manual method, the user select the reminders and the machine uses the selection.

When the candidate content regions are reminders, the detection and identification of reminders may be achieved automatically. However, after the detection stage, further processing and display stages would be similar for the identified reminders and other types of identified content. In the automatic method, the system detects the reminders based on various criteria such as the time the reminders persisted on the board, the type of marks made in a writing or drawing, the location of the writing or drawing and the like.

The automatic way of determining reminder regions may involve using heuristics to identify candidate reminders. A number of rules may be specified. For example, any combination of the following three rules may be used to automatically determine the persisting reminder regions: (1) select marks near the border that persist for a long time; (2) select marks near the border that have a box drawn around them; and (3) select marks that have a pre-defined token or mark associated with them. Other heuristic rules may also be used. For example, bulleted items identified anywhere on the board may be presumed to be a list that is meant to persist and is extracted by the method and the system of the aspects of present invention.

In one aspect of the present invention, if a sufficient sample of reminders can be initially obtained from a particular user, a classifier or other machine-learning technique may be used to detect other reminders that have similar features. In one aspect of the present invention the automatic classification techniques may be augmented with manual or semi-automatic techniques.

The semi-automatic method of identifying reminders may include one or more of the following actions: (1) defining a region that should be scanned for reminders; (2) defining a region that should not be scanned for reminders; (3) correcting mis-classifications by the automatic method and thus potentially training the classifier; and (4) re-sizing or re-scaling the automatically-generated suggestions. The user specifies the regions corresponding to the persistent drawings in advance and the system recognizes changes in those regions as reminder.

After a region is identified by some combination of human and automatic processing, a record is created for that region and saved (11004). Records can be saved in some substantially permanent way such as in a file system or a database. A record contains metadata about the region, including a reference to the image from which the region was extracted, the approximate time the image was first detected on the board, the geometry of the region within the image of the entire board, the date and time the reminder was created, and the identity of the owner of the camera. The owner of the camera is generally the owner of the board when the board is located in one user's office. As one feature of obtaining and storing a record of each region, the record representing a recently identified region may be compared with other stored regions to remove duplicate images.

The display (11007) of one or more of the saved regions on a computer screen may be triggered by user actions or may be automatic. Various user interface mechanisms may be used for the display of reminders. One mechanism allows the reminders to overlay other windows on the screen. The reminders may be shown on demand, or may be made to float above or below the regular windows. The reminders may be displayed with some degree of transparency used to reduce occlusion due to overlay of these reminders on other information being displayed on the screen.

One or more of the saved regions may be displayed as an extension to the user's existing personal information management (PIM) software. For example, as shown in FIG. 10D, the reminders are included in the user's task list in an electronic calendar In various aspects of the present invention, a user may manipulate (11008) the displayed images. The displayed images may be moved; they may be resized and rescaled and may be hidden or deleted. He may hide, delete, move, resize or rescale the regions shown on the display. He may filter which regions should be shown based on color, size, time, or any other metadata associated with each region, and can show the entire image from which the region was selected. Region opacity can be controlled to reduce interference with underlying content. Additional details may be added to a saved reminder at any time and the saved regions may be electronically shared. A user may view the reminders using existing facilities in his personal information management software.

The reminders may be automatically printed (11009) to generate a paper record.

As the above description indicates, the source of the information that is displayed and presented to the user does not originate on the computer. Rather, the original source of the information is a physical object in the environment such as the whiteboard or any equivalent object. Further, the display provided to the user does not represent merely the current state of the physical object. Rather, past states of the physical object that is being displayed, for example reminders that have been since erased from the whiteboard, are also being shown to the user.

Further, the aspects of the present invention do not require the user to know where on the whiteboard the marks were made or the reminders were written in order to retrieve them. As a result, multiple reminders that were written at different times at the same location on the whiteboard may be retrieved without overlapping the reminders on the computer display.

An electronic whiteboard may include features to streamline, but never completely obscure, content regions. Therefore, electronic whiteboard may allow the users to increase the amount of whitespace available on their board without eliminating reminders. However, the aspects of the present invention, while equally applicable to electronic whiteboards, address the space issue on a non-electronic whiteboard that once erased cannot retrieve the erased content. An electronic whiteboard may be imaged using a camera just as a non-electronic whiteboard or blackboard may be imaged.

FIG. 12 is a block diagram that illustrates an embodiment of a computer/server system 1000 upon which an embodiment of the inventive methodology may be implemented.

The system 12000 includes a computer/server platform 12001, peripheral devices 12002 and network resources 12003.

The computer platform 12001 may include a data bus 12004 or other communication mechanism for communicating information across and among various parts of the computer platform 12001, and a processor 12005 coupled with bus 12001 for processing information and performing other computational and control tasks. Computer platform 12001 also includes a volatile storage 12006, such as a random access memory (RAM) or other dynamic storage device, coupled to bus 12004 for storing various information as well as instructions to be executed by processor 12005. The volatile storage 12006 also may be used for storing temporary variables or other intermediate information during execution of instructions by processor 12005. Computer platform 12001 may further include a read only memory (ROM or EPROM) 12007 or other static storage device coupled to bus 12004 for storing static information and instructions for processor 12005, such as basic input-output system (BIOS), as well as various system configuration parameters. A persistent storage device 12008, such as a magnetic disk, optical disk, or solid-state flash memory device is provided and coupled to bus 12001 for storing information and instructions.

Computer platform 12001 may be coupled via bus 12004 to a display 12009, such as a cathode ray tube (CRT), plasma display, or a liquid crystal display (LCD), for displaying information to a system administrator or user of the computer platform 12001. An input device 12010, including alphanumeric and other keys, is coupled to bus 12001 for communicating information and command selections to processor 12005. Another type of user input device is cursor control device 12011, such as a mouse, a trackball, or cursor direction keys for communicating direction information and command selections to processor 12004 and for controlling cursor movement on display 12009. This input device typically has two degrees of freedom in two axes, a first axis (e.g., x) and a second axis (e.g., y), that allows the device to specify positions in a plane.

An external storage device 12012 may be connected to the computer platform 12001 via bus 12004 to provide an extra or removable storage capacity for the computer platform 12001. In an embodiment of the computer system 12000, the external removable storage device 12012 may be used to facilitate exchange of data with other computer systems.

The invention is related to the use of computer system 12000 for implementing the techniques described herein. In an embodiment, the inventive system may reside on a machine such as computer platform 12001. According to one embodiment of the invention, the techniques described herein are performed by computer system 12000 in response to processor 12005 executing one or more sequences of one or more instructions contained in the volatile memory 12006. Such instructions may be read into volatile memory 12006 from another computer-readable medium, such as persistent storage device 12008. Execution of the sequences of instructions contained in the volatile memory 12006 causes processor 12005 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 12005 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 12008. Volatile media includes dynamic memory, such as volatile storage 12006. Transmission media includes coaxial cables, copper wire and fiber optics, including the wires that comprise data bus 12004.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 705 for execution. For example, the instructions may initially be carried on a magnetic disk from a remote computer. Alternatively, a remote computer can load the instructions into its dynamic memory and send the instructions over a telephone line using a modem. A modem local to computer system 12000 can receive the data on the telephone line and use an infra-red transmitter to convert the data to an infra-red signal. An infra-red detector can receive the data carried in the infra-red signal and appropriate circuitry can place the data on the data bus 12004. The bus 12004 carries the data to the volatile storage 12006, from which processor 12005 retrieves and executes the instructions. The instructions received by the volatile memory 12006 may optionally be stored on persistent storage device 12008 either before or after execution by processor 12005. The instructions may also be downloaded into the computer platform 12001 via Internet using a variety of network data communication protocols well known in the art.

The computer platform 12001 also includes a communication interface, such as network interface card 12013 coupled to the data bus 12004. Communication interface 12013 provides a two-way data communication coupling to a network link 12014 that is connected to a local area network (LAN) 12015. For example, communication interface 12013 may be an integrated services digital network (ISDN) card or a modem to provide a data communication connection to a corresponding type of telephone line. As another example, communication interface 12013 may be a local area network interface card (LAN NIC) to provide a data communication connection to a compatible LAN. Wireless links, such as well-known 12002.11a, 12002.11b, 12002.11g and Bluetooth may also be used for network implementation. In any such implementation, communication interface 12013 sends and receives electrical, electromagnetic or optical signals that carry digital data streams representing various types of information.

Network link 12013 typically provides data communication through one or more networks to other network resources. For example, network link 12014 may provide a connection through LAN 12015 to a host computer 12016, or a network storage/server 12017. Additionally or alternatively, the network link 12013 may connect through gateway/firewall 12017 to the wide-area or global network 12018, such as an Internet. Thus, the computer platform 12001 can access network resources located anywhere on the Internet 12018, such as a remote network storage/server 12019. On the other hand, the computer platform 12001 may also be accessed by clients located anywhere on the LAN 12015 and/or the Internet 12018. The network clients 12020 and 12021 may themselves be implemented based on the computer platform similar to the platform 12001.

The LAN 12015 and the Internet 12018 both use electrical, electromagnetic or optical signals that carry digital data streams. The signals through the various networks and the signals on network link 12014 and through communication interface 12013, which carry the digital data to and from computer platform 12001, are exemplary forms of carrier waves transporting the information.

Computer platform 12001 can send messages and receive data, including program code, through the variety of network(s) including Internet 12018 and LAN 12015, network link 12014 and communication interface 12013. In the Internet example, when the system 12001 acts as a network server, it might transmit a requested code or data for an application program running on client(s) 12020 and/or 12021 through Internet 12018, gateway/firewall 12017, LAN 12015 and communication interface 12013. Similarly, it may receive code from other network resources.

The received code may be executed by processor 12005 as it is received, and/or stored in persistent or volatile storage devices 12008 and 12006, respectively, or other non-volatile storage for later execution. In this manner, computer system 12001 may obtain application code in the form of a carrier wave.

Figure 13:
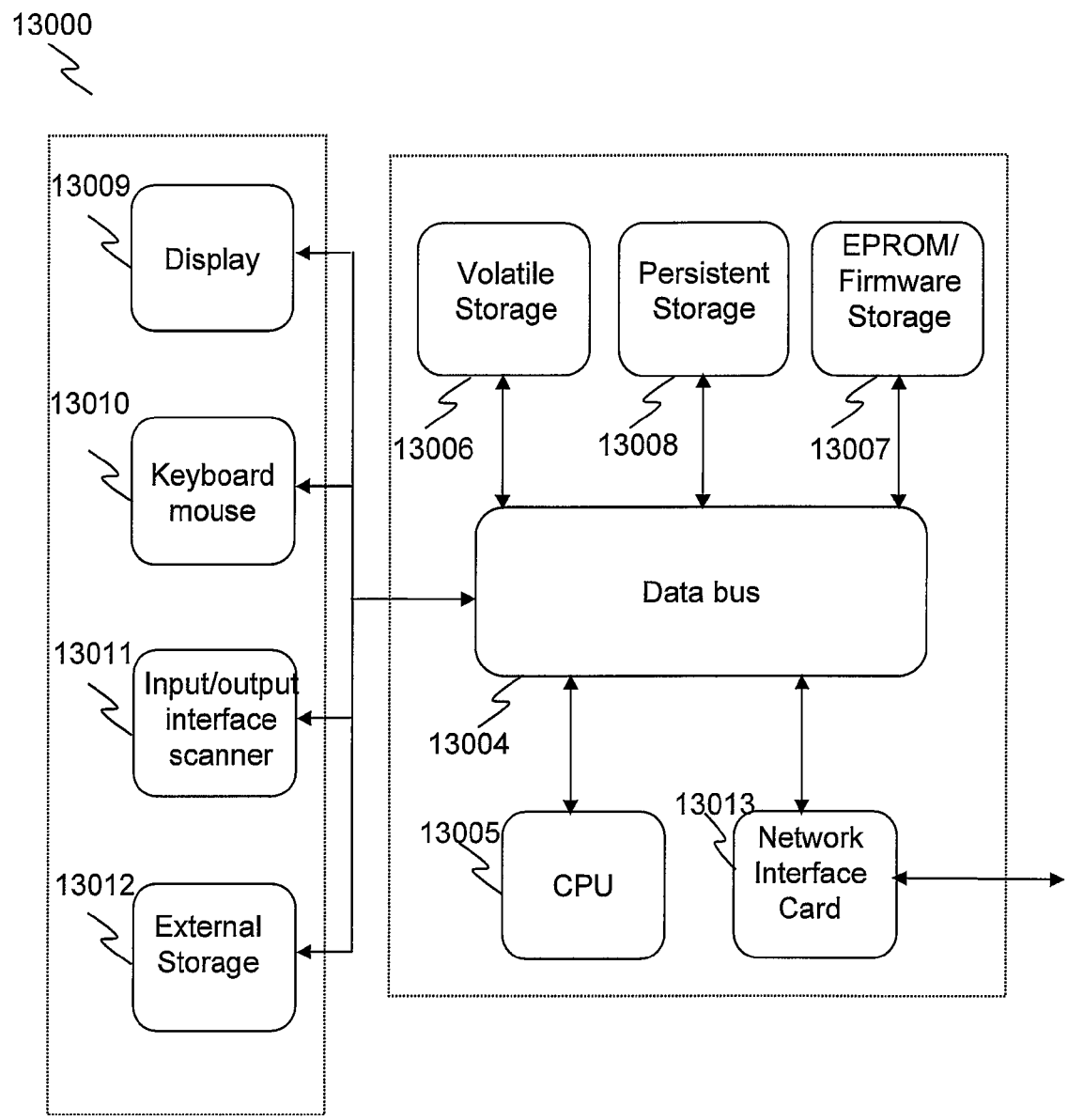
FIG. 13 illustrates an exemplary functional diagram that is used to show how the various aspects of the present invention relate to a computer platform.

FIG. 13 illustrates an exemplary functional diagram that is used to show how the various aspects of the present invention relate to a computer platform. This figure may be used to show how the collaborative sharing aspect of the present invention, the preservation of history and context aspect of the present invention, or the re-display of persistent reminders aspect of the present invention relate to a computer platform.

When the device 13000 represents the collaborative detection, archiving and sharing device, the device 13000 may include a central processing unit (CPU) 13005 and a RAM/ROM unit 13006, 13007, 13008 that are used to process the images from the digital camera and the sensed data transmitted by the motion and collaboration sensors. The images and the sensed data may be archived in an external storage 13012 which may be included in a central server or coupled to the device 13000 or they may reside on a persistent storage 13008 of the device itself. An input/output interface 13011 or network interface card 13013 may be used to receive the images and the sensed data and to send the collected data to the pertinent collaborators. The input/output interface 13011 may also include a camera for pointing at the whiteboard and collecting the digital photographs of the whiteboard itself instead of receiving them from an external camera. Further, the motion and collaboration sensors may be included as part of the device 13000.

When the device 13000 represents the preservation of history and context device according to the aspects of the present invention, then the device 13000 may include a central processing unit (CPU) 13005 and a RAM/ROM unit 13006, 13007, 13008 that are used to process the images and the timeline received from the digital camera. The images together with their associated timeline and other metadata may be archived in an external storage 13012 which may be included in a central server or coupled to the device 13000 or they may reside on a persistent storage 13008 of the device itself. An input/output interface 13011 or network interface card 13013 may be used to receive the images and the associated time data. The input/output interface 13011 may also include a camera for pointing at the whiteboard and collecting the digital photographs of the whiteboard itself instead of receiving them from an external camera. The change in image data may be processed by the CPU 13005 and the generated heatmap may be shown on the display 13009.

When the device 13000 represents the system for collection and redisplay of persistent messages device according to the aspects of the present invention, then the device 13000 may include a central processing unit (CPU) 13005 and a RAM/ROM unit 13006, 13007, 13008 that are used to process the images from the whiteboard, identify the persistent message and redisplay them to the user on a screen such as display 13009. The images together with their associated timeline and other metadata may be archived in an external storage 13012 which may be included in a central server or coupled to the device 13000 or they may reside on a persistent storage 13008 of the device itself. An input/output interface 13011 or network interface card 13013 may be used to receive the images and the associated persistence data. The input/output interface 13011 may also include a camera for pointing at the whiteboard and collecting the digital photographs of the whiteboard itself instead of receiving them from an external camera. The detection of persistent image data may be processed by the CPU 13005 and the extracted reminders may be shown on the display 13009 or sent to another user computer for being displayed.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct a specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the inventive system. It is intended that the specification and examples be considered as exemplary only, with a true scope and spirit of the invention being indicated by the following claims and their equivalents.

What is claimed is:

1. A method for automatic detection of collaborative content created on a display board, the method comprising:
   detecting multiple users positioned in a vicinity of the display board to classify user activity in the vicinity of the display board as collaborative activity;
   automatically classifying as collaborative content, a content change on the display board that occurs during the collaborative activity;
   automatically archiving the collaborative content and providing the collaborative content for retrieval by one or more collaborators; and
   capturing images of the display board
   at regular time intervals beginning after a period of sensing an activity near the display board and ending after a period of absence of activity near the display board, and
   after a changing of a first instance of collaborative activity into a second, different instance of collaborative activity, or when an unobstructed view of the display board is sensed.

2. The method of claim 1, further comprising:
   receiving images of the display board and,
   detecting of the content change on the display board, which comprises comparing each image to a preceding image acquired at a prior point of time.

3. The method of claim 2, wherein the classifying as collaborative content includes:
   comparing a first image captured before the user activity is classified as collaborative activity to one or more second images captured after a beginning of the collaborative activity.

4. The method of claim 2, further comprising:
   identifying the users.

5. The method of claim 4, further comprising:
   sharing the collaborative content with the users by transmitting the collaborative content to the users.

6. The method of claim 5, further comprising:
   archiving the images of the display board together with first metadata indicating a time of capture of the image and a location of the display board; and
   archiving the collaborative content together with second metadata indicating identity of the users in the collaborative activity, date, time and duration of the collaborative activity, and the location of the display board.

7. The method of claim 1, further comprising detecting the content change, which comprises one or a combination of:
   detecting a change in video images captured by one or more cameras directed at the display board, and
   detecting a change in still images captured by the one or more cameras directed at the display board.

8. The method of claim 1, wherein the detecting multiple users positioned within the vicinity of the display board comprises using data from one or more of camera images, audio sensors, motion sensors, vibration sensors, weight sensors, radio frequency identification devices, and wireless communication devices which sense the user activity in the vicinity of the display board.

9. The method of claim 1, wherein the collaborative content includes one or more of first content created during the collaborative activity, second content modified during the collaborative activity and third content adjacent to and related to the first content or the second content.

10. The method of claim 1, wherein the automatically archiving collaborative content comprises capturing the collaborative content in a digital file and electronically transmitting the digital file to at least one of the multiple users.

11. The method of claim 1, wherein the display board comprises a non-electric display board.

12. A system for automatic detection of collaborative content on a display board, the system comprising:
   one or more sensors that detect multiple users positioned in a vicinity of the display board to classify user activity in the vicinity of the display board as a collaborative activity;
   one or more processors that automatically classifies as collaborative content, a content change that occurs during the collaborative activity;
   a database for archiving data representative of the change in content on the display board and information regarding the collaborative activity in the vicinity of the display board and making the collaborative content available for retrieval by one or more collaborators; and
   a camera for capturing images of the display board at
   at regular time intervals beginning after a period of sensing of an activity near the display board and ending after a period of absence of activity near the display board, and
   after the changing of a first instance of collaborative activity into a second, different instance of collaborative activity, or opportunistically when a clear view path to the display board is sensed.

13. The system of claim 12, wherein the content change on the display board is detected by comparing each image to a preceding image acquired at a prior point of time.

14. The system of claim 12, further comprising:
   one or more devices for detecting identities of users in the collaborative activity,
   wherein the one or more devices comprise face recognition module and active badges.

15. The system of claim 12, wherein the one or more sensors that detect multiple users positioned within the vicinity of the display board provide a binary indication of human activity showing either presence of activity or absence of activity.

16. The system of claim 12, wherein the one or more sensors for detecting multiple users being positioned within the vicinity of the display board to define the collaborative activity comprise one or more of:
   a camera for capturing still pictures of a vicinity of the display board,
   an audio sensor for sensing audio streams sensed in the vicinity of the display board,
   a video sensor for sensing video streams in the vicinity of the display board,
   a vibration sensor,
   a weight sensor,
   a motion sensor,
   radio frequency identification devices,
   wireless communication devices, and
   face detection module,
   wherein the indicators collected by the one or more sensors are fused together.

17. The system of claim 12, wherein the data collected at the display board further includes location of the display board and time of capture of each of the images of the display board.

18. The system of claim 12, wherein the database archives the data by capturing the collaborative content in a digital file and electronically transmits the digital file to at least one of the multiple users.

19. The system of claim 12, wherein the display board comprises a non-electric display board.

* * * * *